United States Patent [19]
Fujii

[11] Patent Number: 5,701,293
[45] Date of Patent: Dec. 23, 1997

[54] TROUBLE SURVEILLANCE APPARATUS FOR A TRANSMISSION SYSTEM

[75] Inventor: Yasuo Fujii, Kanagawa, Japan

[73] Assignee: Fujitsu Limited, Kanagawa, Japan

[21] Appl. No.: 520,744

[22] Filed: Aug. 29, 1995

[30] Foreign Application Priority Data

Aug. 29, 1994 [JP] Japan .................. 6-203146

[51] Int. Cl.$^6$ ................ H04J 3/14; H04J 14/00
[52] U.S. Cl. .................... 370/244; 370/250; 371/68.2
[58] Field of Search .................... 370/13, 14, 17, 370/68.1, 110.1, 242, 244, 250, 384, 522; 371/20.1, 68.2; 359/110

[56] References Cited

U.S. PATENT DOCUMENTS

| | | | |
|---|---|---|---|
| 4,592,044 | 5/1986 | Ferenc | 370/13 |
| 5,197,062 | 3/1993 | Picklesimer | 370/13 |

FOREIGN PATENT DOCUMENTS

| | | |
|---|---|---|
| 0 085 437 | 8/1983 | European Pat. Off. . |
| 0 414 385 | 2/1991 | European Pat. Off. . |
| 0 474 932 | 3/1992 | European Pat. Off. . |
| 0 613 270 | 8/1994 | European Pat. Off. . |
| 2 222 351 | 2/1990 | United Kingdom . |
| 90/14725 | 11/1990 | WIPO . |

*Primary Examiner*—Melvin Marcelo
*Attorney, Agent, or Firm*—Helfgott & Karas, P.C.

[57] ABSTRACT

An input memory storing data representing lines and paths of the transmission system. Every time such data is input in the memory, a comparison element compares the previous state of the system stored in the memory with a state of the system currently input in the memory. If no change is found between them, the current state of the system is kept the same as the previous state thereof. This means that no new trouble is caused or that no rectification of trouble is made. It is therefore judged that no trouble is caused. If any change is found, a trouble judging element seeks trouble corresponding to the change to store data as a link in a trouble memory. Unless any change is found, the previous input data is only compared with the currently input data. The process at an idling time can thus be conducted at a higher speed.

21 Claims, 27 Drawing Sheets

FIG. 1    PRIOR ART

| SLOT POSITION / UNIT | | ① | ② | ③ | ④ | ⑤ | ⑥ | ⑦ | ⑧ | ⑨ | ⑩ | ⑪ | ⑫ | ⑬ | ⑭ | ⑮ | ⑯ | ⑰ |
|---|---|---|---|---|---|---|---|---|---|---|---|---|---|---|---|---|---|---|
| STM4 | MOUNTED | — | — | — | O | O | O | O | — | — | — | — | — | — | — | — | — | — |
|  | REDUNDANT | | | | 1+1 | 1+1 | 1+1 | 1+1 | | | | | | | | | | |
|  | NOT REDUNDANT | | | | — | — | — | — | | | | | | | | | | |
| STM1 | MOUNTED | — | — | — | O | O | O | O | — | — | O | O | O | O | O | O | — | — |
|  | REDUNDANT | | | | 1+1 | 1+1 | 1+1 | 1+1 | | | 1+1 | 1+1 | 1+1 | 1+1 | 1+1 | 1+1 | | |
|  | NOT REDUNDANT | | | | — | — | — | — | | | — | — | — | — | — | — | | |
| DICH | MOUNTED | — | — | — | — | — | — | — | — | — | — | O | O | O | O | — | — | — |
|  | 1:1 | | | | | | | | | | | — | — | — | WK PT | | | |
|  | 2:1 | | | | | | | | | | | — | — | WK | WK PT | | | |
|  | 3:1 | | | | | | | | | | | — | WK | WK | WK PT | | | |
|  | 1:0 | | | | | | | | | | | WK | WK | WK | WK | — | | |

| NO | TARGET UNIT | TROUBLE | SA JUDGING CONDITION | JUDGEMENT |
|---|---|---|---|---|
| ① | STM1 STM4 | LOS LOF MIS-STI E-ERR | 1. IF WK AT REDUNDANT TIME, SA.<br>2. IF PT AT REDUNDANT TIME, SA WHEN EITHER (1) OR (2) IS ARRANGED ON WK. | LINE |
| | | SD STEP DEP AIS LOP | 3. IF WK AT REDUNDANT TIME AND IF NOT REDUNDANT, SA WHEN ONLY ONE OF ALL CONNECTED ASSOCIATE PATHS MEETS THE FOLLOWING.<br>(1) WHEN PATH IS EXPRESSED BY PSR=N<br>(2) WHEN PATH IS NOT BEING WORKED AND WHEN PATHS ON WK ARE UNDER SA STATE<br>(3) WHEN PATH IS BEING WORKED | PATH |
| ③ | S1CH S4CH | RMV (FAC OOS) FAIL MISMNT A | | |
| ⑤ | TSI | AU AIS VC4 MIS-PTI MIS-PSL HO-UNEQ LOM STEP DEP TU LOP | 1. IF ONLY ONE OF ALL CONNECTED ASSOCIATE PATHS MEETS THE FOLLOWING, SA.<br>(1) WHEN PATH IS EXPRESSED BY PSR=N<br>(2) WHEN PATH IS NOT BEING WORKED AND WHEN PATHS ON WK SIDE ARE UNDER SA STATE<br>(3) WHEN PATH IS BEING WORKED | PATH |
| ⑦ | TSI | EQPT FAIL (EQPT OOS) MISMNT A | 1. IF CAUSED ON WK SIDE, SA.<br>2. WHEN CAUSED ON PT SIDE AND IF (7) IS ARRANGED ON WK SIDE, SA. | EQPT |
| | | | 3. IF VC4 IS CONNECTED AND WHEN ONLY ONE OF ALL CONNECTED ASSOCIATE PATHS MEETS THE FOLLOWING, SA<br>(1) WHEN PATH IS EXPRESSED BY PSR=Y AND IT IS NOT BEING WORKED PATHS ON WK SIDE ARE UNDER SA STATE<br>(2) WHEN PATH IS EXPRESSED BY PSR=Y AND IT IS BEING WORKED | PATH |
| ⑧ | 2MVC12 | TU AIS MIS-PTI MIS-PSL LO-UNEQ STEP DEP BIP MJ BIP MN | 1. WHEN ONLY ONE OF ALL CONNECTED ASSOCIATE PATHS MEETS THE FOLLOWING, SA.<br>(1) WHEN PATH IS EXPRESSED BY PSR=N<br>(2) WHEN PATH IS NOT BEING WORKED AND WHEN PATHS ON WK SIDE ARE UNDER SA STATE<br>(3) WHEN PATH IS BEING WORKED | PATH |
| ⑨ | 2MVC12 | EQPT FAIL (EQPT OOS) MISMNT A | 1. IF CAUSED ON WK SIDE, SA.<br>2. IF ONLY ONE OF ALL WKs INCLUDES (9) WHEN CAUSED ON PT SIDE, SA. | EQPT |

FIG. 2   PRIOR ART

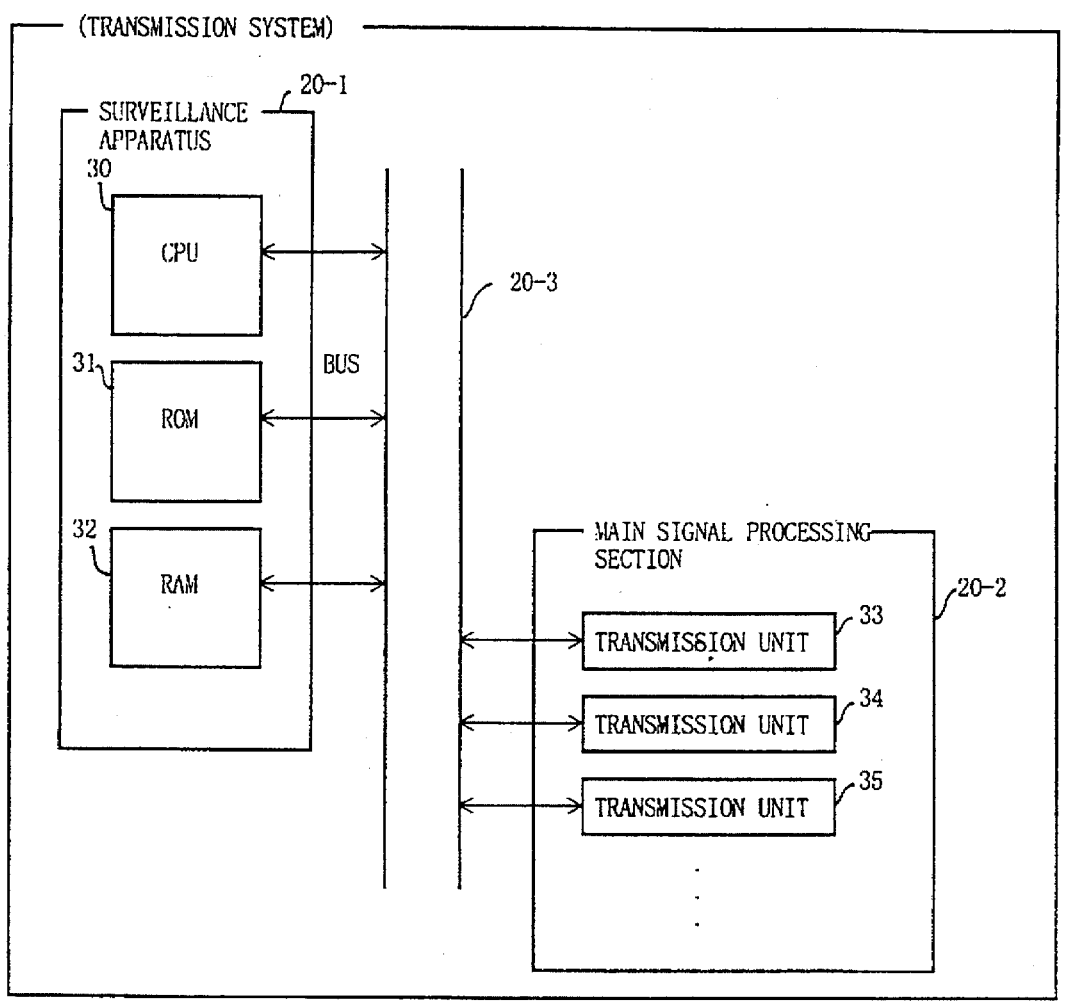
F I G. 1 5

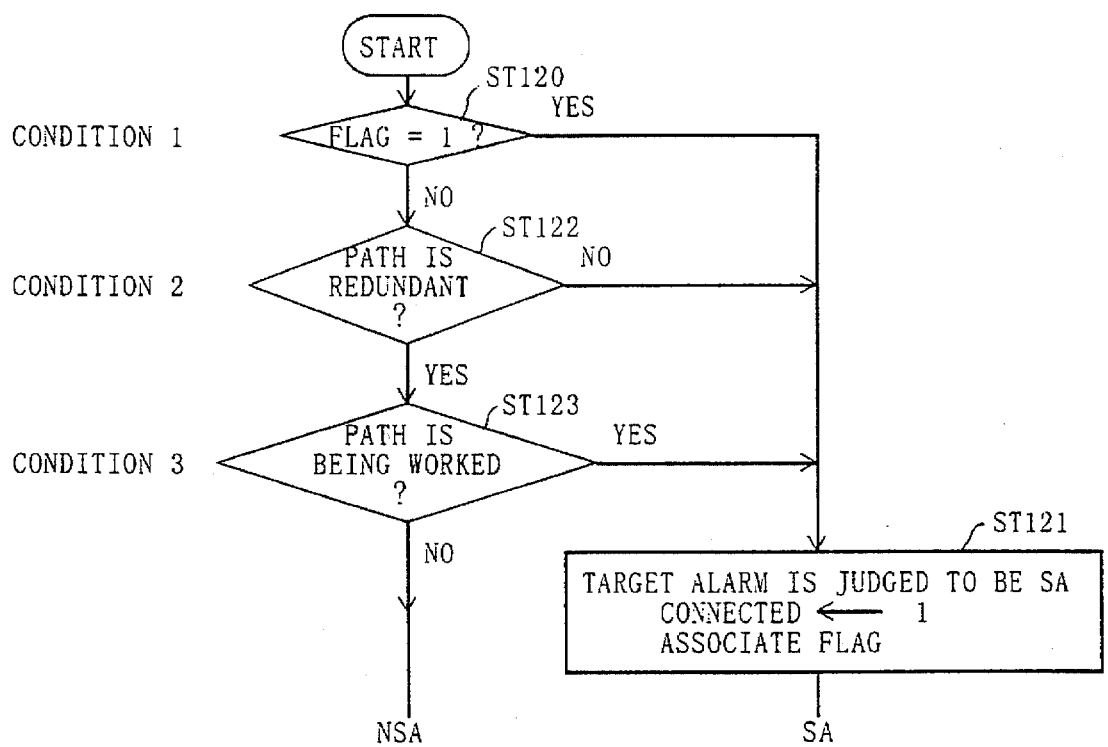
F I G. 17

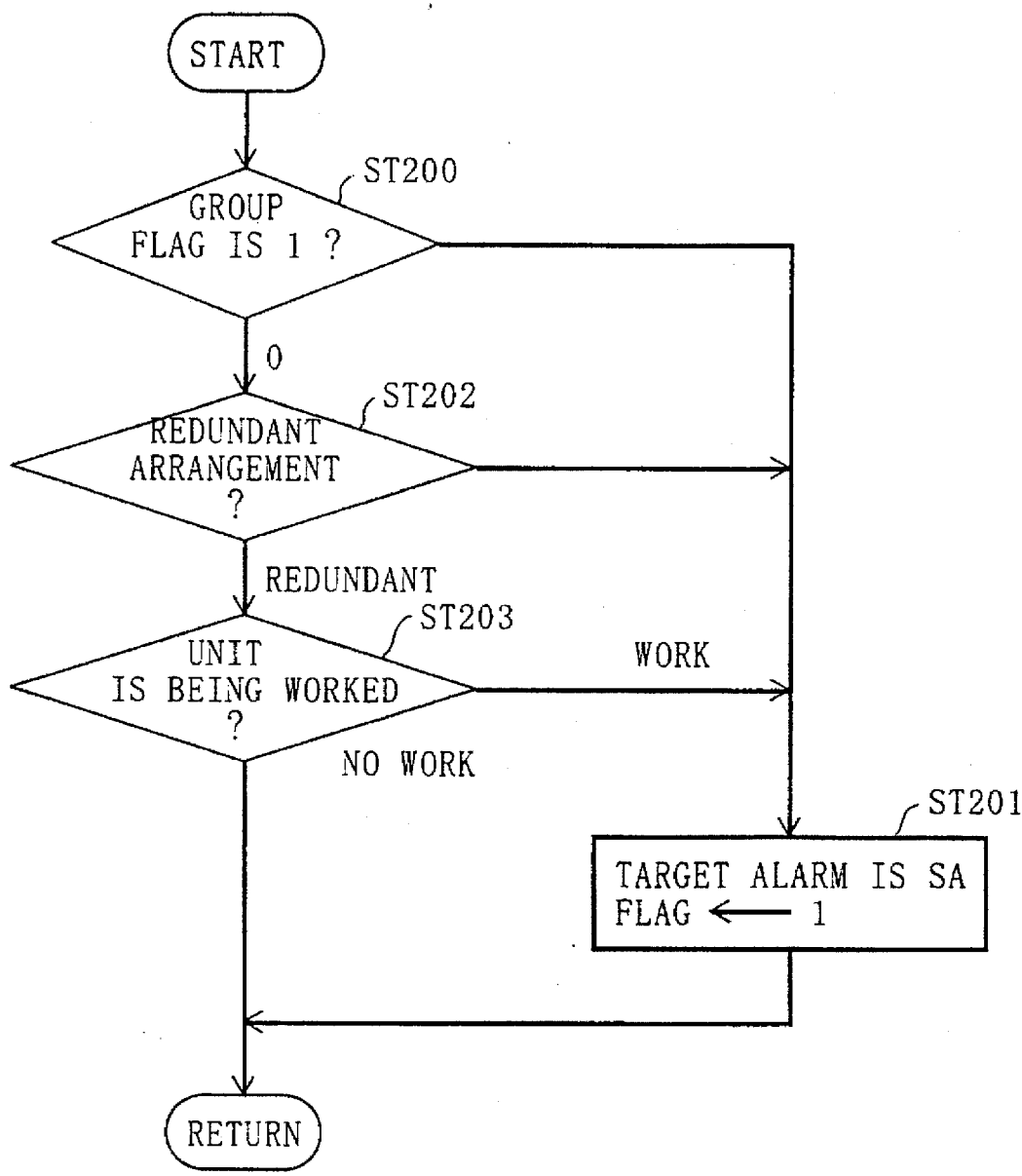
F I G. 25

TROUBLE SURVEILLANCE APPARATUS FOR A TRANSMISSION SYSTEM

BACKGROUND OF THE INVENTION

1. Field of the Invention

The present invention relates to a data transmission system and, more particularly, a trouble surveillance apparatus for a transmission system capable of more stably informing its operators of any influences caused by troubles.

2. Prior Art of the Invention

As information networks develop, the transmission volume of transmission systems becomes larger and larger these days. As a transmission system of this kind, for example, the new synchronous system in Japan, the synchronous optical network (SONET) system in North America, and the synchronous digital hierarchy (SDH) system in Europe and other countries, can be cited.

As a consequence, system management and surveillance need to become more detailed as the transmission volumes become larger. The conventional trouble surveillance, for example, it aims only at finding troubles and repairing them. Today, however, a further process of judging the influence on the network service of by troubles and informing system operators of the results thus judged is needed. To meet this need, the transmission systems have become complicated in construction, thereby making the judging process equally complicated, and making it difficult to realize the judging process by just a simple algorithm.

Citing the SDH system, it will be described how troubles are judged in a conventional transmission system.

NSA (none service affect) means such a trouble that can be restored by redundancy and other functions within the transmission system, and that has no influence on the transmission service. SA (service affect) means such a trouble that has influence on the transmission service. For judging these troubles, redundancy and other functions must also be considered.

On the other hand, the SDH system has, for example, twelve transmission slots in one location, and various kinds of interface are realized by selecting the type of transmission units mounted in the transmission slots and further by cross-connecting them through TSI units.

FIG. 1 shows slots relative to transmission units. As the transmission units, for example, STM4 (synchronous transport module) optical, STM1 optical and D1 interface units can be cited. When STM4 optical units are allotted to slots S4–S7, as shown in FIG. 1, for example, either two or four of them can be mounted. They can be mounted to provide redundancy, and where slots S5 and S7 are positions into which STM4 optical units are inserted, whether or not redundancy is provided, and slots S4 and S6 are positions in which STM4 optical units are mounted to provide redundancy when redundancy is required. The same thing can be said about STM1 optical units. They can also be inserted into slots S4–S7, and those which are mounted in slots S5 and S7 correspond to the required volume, whether or not redundancy is provided. Further, they are inserted into slots S4 and S6 when redundancy is required. They can also be inserted into slots S10–S15.

D1 interface units (D1CH) can be inserted into slots S11–S14. A PT (protect) is inserted into the slot S14 and WKs (work) are inserted into slots S11–S13. When WK and PT units are in the ratio of 1 to 1, for example, the WK unit is inserted in the slot S13; when they are in the ratio of 2 to 1, WKs are inserted in slots S12 and S13; and when they are in the ratio of 3 to 1, WKs are inserted in slots S11, S12 and S13. The WK unit represents a currently-used interface in this case, and when trouble is caused, it is switched over the PT interface to rectify the trouble. Further, no redundancy is provided, that is, no PT unit is provided in some cases. When trouble is caused in any of these units, their trouble conditions and conditions under which SA is judged relative to them are different for each unit.

FIG. 2 shows trouble in each of the conventional units and conditions under which SA is judged.

Each unit and its trouble will be described first.

An STM1 or STM4 optical unit is intended to convert from optical signals to electrical signals and vice versa. This unit analyzes an STM1 signal up to the AU4 (administrative unit 4) signal of the SDH system. During this analysis, it analyzes RS OHB (regenerator section overhead byte) and MS OHB (multiplex section overhead byte) of the SDH system to check troubles. Troubles caused in this unit are as follows.

Caused in the RS are troubles "LOS" (optical signal input off), "LOF" (set out of STM1 optical signals) and "MIS-STI" (trace mismatch of RS). Synchronizing A1 and A2, which are component bytes in the RSOH, in the case of trouble "LOF", and using L1 bytes in the case of trouble "MIS-STI", an optional character string is transmitted between transmission systems, and a transmission value and a reception-expected value are set on transmission and reception sides, and they are compared with each other. Connection errors of the optical cables are thus surveyed.

Further, a trouble "E-ERR" is a deterioration of signal, and it is caused when a parity check value obtained using B2 bytes exceeds a certain value. A trouble "SD" is also a deterioration of signal, and it has a smaller number of errors compared with the trouble "E-ERR".

Troubles "E-ERR" and "SD" are surveyed on the basis of the number of errors caused in a short period of time (for example, one second), and a trouble "STEP" is caused when the state of exceeding a threshold value smaller than those that of troubles "E-ERR" and "SD", lasts for ten seconds or more. A trouble "DEP" is caused when a value obtained by summing up a still smaller number of errors every 15 minutes or 24 hours, exceeds the threshold value. Basically, the troubles "STEP" and "DEP" are not caused not when the signal is off, but when noise lasts for a long time.

A trouble "AIS" means that signal-off trouble is caused in a system arranged upstream of the local station. When the transmission system in the local station receives the trouble, such as a "LOS", a signal which is to be transmitted to a system arranged downstream of the local station becomes unstable. An AIS signal is transmitted accordingly.

A trouble "LOP" means that an AU4 pointer is off. All of the above-mentioned troubles are related to signals received through optical cables.

A TSI unit is intended to control an associate for every TU12 to which a signal is to be sent between optical and 2MVC12 units. A Signal is received every AU4 from the optical unit, analyzed to VC4, further analyzed to TU12, cross-connected every TU12 (control of the mate), and transmitted to an optional 2MVC 12 unit. On the contrary, a signal received from the 2MVC12 unit is cross-connected every TU12, put from VC4 to AU4, and transmitted to the optical unit. Troubles in this TSI unit are as follows. TU12 (tributary unit 12), AU4 (administrative unit 4) and VC4 (virtual container 4), in this case are also intended for signals generated when the number of SDH interfaces is increased.

A trouble "AU AIS" means that an AIS signal is received at the level of the AU4. In short, it means that signal-off of AU4 is caused upstream of this unit.

A trouble "MIS-PTI of the VC4" means a mismatch of trace values of the VC4. In short, it means that the trace value on a J1 byte does not coincide with an expected value. A trouble "MIS-PSL of the VC4" means that the C2 byte value of the VC4 is abnormal.

A trouble "HO-UNEQ" denotes that the C2 byte value of the VC4 is 00. In short, it means that no meaningful signal is present in the VC4.

A trouble "LOM" means signal-off in the VC4, a trouble "STEP" is same as the trouble "STEP" in the optical units, and a trouble "DEP" is also same as the trouble "DEP" in the optical units. A trouble "TU LOP" represents that a TU12 port is broken. All of the above-mentioned troubles are related to direction signals applied to the TSI unit.

A 2MVC12 unit serves to analyze a TU12 signal received from the TSI unit into VC12, while carrying out SW control (or path SW) every VC12, and output it as a C12 (container 12) external to the system. Conversely, it also serves to form the TU12 from signal C12 of the PDH and send it to the TSI unit. Troubles caused in this 2MVC12 are as follows.

A trouble "TU AIS" denotes an AIS signal in the TU12, and a trouble "MIS-PTI" represents a trace mismatch by J2 byte in the VC 12. A trouble "MIS-PSL" means that SIGNAL LABEL values in V5 byte are abnormal. It defines kinds of signal of the VC 12 in this manner. A trouble "LO-UNEQ" means that a signal of the VC12 is meaningless. In short, it denotes that no traffic is present on a pay load of the VC12. A trouble "STEP" denotes a parity error of a BIP-2 (bit interleaved parity-2) in the V5 byte, whose contents are same as those of the trouble "STEP" in the optical unit. A trouble "DEP" denotes a parity error of the BIP-2 in the V5 byte, whose contents are same as those of the trouble "DEP" in the optical unit. A trouble "BIP MJ" represents a parity error of the BIP-2 in the V5 byte, whose contents are same as those of the trouble "E-ERR" in the optical unit. A trouble "BIP MN" denotes a parity error of the BIP-2 in the V5 byte, whose contents are same as those of the trouble "SD" in the optical unit. All of the above-mentioned troubles are related to direction signal received from the TSI unit.

As troubles common to all units, "EQPT-FAIL" and "MISMNT A" can be cited. The trouble "EQPT-FAIL" means that an LSI in a related unit is out of order or that a clock is broken. In short, it denotes a failure of the unit. The trouble "MISMNT A" means that the unit is incorrectly mounted.

In the case of the troubles "LOS", "LOF", "MIS-STI", "E-ERR", "SD", "STEP", "DEP" and "AIS LOP" in STM1 and STM4 optical units, they are judged to be SA if they are caused in the WK unit during redundancy. They are also judged to be SA if they are caused in the PT during redundancy and when either of STM1 and STM4 optical units and S1CH and S4CH units is found in the WK unit. The judgment in this case becomes a trouble on the LINE. They are also judged to be SA if they are caused in the WK unit during redundancy and when redundancy is not provided, but any one of paths of all connected associates is in one of the following conditions.

(1) When the path is expressed by PSR (path switch ring)=N. In short, when the path is used in one side circuit;

(2) When the path is not used but it is in the state of SA on the work side; and (3) When the path is used.

In the case of troubles "RMV (FAC OOS)" and "FAIL MISMNT" in the S1CH and S4CH units, the same applies as for the STM1 and STM4 optical units can be said. The trouble "RMV (FAC OOS)" means that a unit is not-mounted.

When troubles in the TSI unit are "AU AIS" and "MIS-PTI", "MIS-PSL", "HO-UNEQ", "LOM", "STEP", "DEP" and "TU LOP", and if any one of paths of all connected associates is in one of the above-mentioned three conditions (1)–(3), the path is judged to be SA.

When troubles in the TSI unit are "FAIL of EQPT (EQPT DOS)" and "MISMNT A", and if they are caused on the WK side, they are judged to be SA, and if they are caused on the PT side and the TSI unit is found to be on the WK side, they are judged to be SA. If the VC4 is connected and any one of paths of all connected associates is in one of the following conditions, the path is judged to be SA.

(1) When the path is expressed by PSR=Y, in short, when the path is of the redundant type and it is not used, but is in the state of SA on the WK side; and (2) When the path is expressed by PSR=Y and it is used.

When troubles in the 2MVC12 unit are "TU AIS", "MIS-PTI", "MIS-PSL", "LO-UNEQ", "STEP", "DEP", "BIP MJ" and "BIP MN" and if any one of paths of all connected associates is in one of the following conditions, the path is judged to be SA.

(1) When the path is expressed by PSR=N;

(2) When the path is not used but it is in the state of SA on the work side; and (3) When the path is used.

When troubles in the 2MVC 12 unit are "FAIL of EQPT (EQPT OOS)" and "MISMNT A", and if they are caused on the WK side, they are judged to be SA, and if they are caused on the PT side and any one of all WKs is the 2MVC12 unit, they are judged to be SA.

FIGS. 3 through 8 show how troubles are judged to be NSA and SA. FIG. 3 shows how troubles are judged to be NSA when they are caused on the LINE. STM1 optical units 1 and 2 are connected to an MSP (multiplex section protection) 3. The MSP unit 3 surveys the state of an STM-N circuit and switch the WK to the PT and vice versa. When a circuit on the WK side is defective, for example, it is switched to the PT side to keep the circuit unbroken. The MSP unit 3 is connected to a TSI (time switch interface) unit 4, which is further connected to a D1 unit 5. A path is thus formed. In FIG. 3, the STM1 unit 1 is connected to a CPR through the MSP, TSI and D1 units 3, 4 and 5 to thereby form the path. When any trouble is caused on a line to which the STM1 unit 2, not included in the above path, is connected, the trouble "LOS" is judged to be NSA because it has no influence on the other connection.

FIG. 4 shows how troubles are judged to be SA when they are caused on the LINE. The STM1 optical unit 2 is connected to the MDP, TSI and D1 units 3, 4 and 5 to thereby form a path. When any trouble is caused in the STM1 unit 2 in this case, the trouble "LOS" is judged to be SA. In the case of a LOS alarm at line trouble, the trouble is judged to be NSA when the line does not form a path, but it is judged to be SA when the line forms a path.

In the case of trouble on the LINE, the state in the trouble-causing unit and the state in the redundancy-arranged unit are confirmed, and when the trouble is caused in both of them or in the currently used unit, it is judged to be SA.

FIG. 5 shows that redundancy is added to STM1 optical units 1 and 2 and MSP, TSI and D1 units 3, 4 and 5 in FIG. 4. In short, MPS unit 6 and STM1 optical units 7 and 8 are added to them. When any trouble is caused in the STM1 optical unit 2 in FIG. 5, the LOS alarm is judged to be NSA because this trouble has no influence on the other path. When any trouble is caused in the path in the TSI unit 4 as shown in FIG. 6, however, the trouble "LOP" is judged to be SA. Similarly, the trouble "LOS" in the STM1 unit 2 currently connected is judged to be SA.

Namely, two troubles in the TSI unit 2 are checked and when troubles are caused on both paths, they are judged to be SA. In addition, the trouble "AIS" and the LOP ALARM are caused on both paths. Therefore, the LOP ALARM is determined to be SA. However, the LOS ALARM can not be judged to be SA because it is complicated to relate the LOS ALARM to the trouble "LOP".

FIG. 7 shows how troubles are judged to be NSA when they are caused in channel (CH) paths. Although an LOS ALARM is caused in the STM1 optical unit 2 in this case, it is judged to be NSA because it has no influence on the other path. When the trouble "MAJ" is caused on the connected side of the D1 unit 5, for example, as shown in FIG. 8 in which channel (CH) path trouble is judged to be SA, however, the trouble "MAJ" in the D1 unit 5 is judged to be SA. The trouble "MAJ" in this case has a larger number of errors which is expressed by BIP-n. When trouble is further caused in the STM1 unit 2 connected to the D1 unit 5, it is judged to be SA because a further path cannot be formed because of the trouble in the STM1 optical unit 2, in a case where switchover is to be made to that side in the D1 unit 5 on which the trouble is caused.

In the conventional trouble surveillance apparatus, SA/NSA judgment is made for just one unit. Namely, the LOS ALARM can not be judged to be SA because it is difficult to relate the LOS ALARM to trouble in the other unit. In short, it is difficult to make an SA/NSA judgment while relating a trouble to those units arranged upstream of the current unit.

The above-described trouble judgment is conducted for every group. FIGS. 9 and 10 are flow charts showing how conventional troubles are collected and processed. (1) and (2) in FIGS. 9 and 10 represent connection points. When collection and process are started (START) to detect troubles, 0 is set in a register I at a step ST1. A content in a memory region appointed by IO address + a value of I register is stored in a register A at a step ST2. As will be described later, the IO address appoints the smallest one of each of inputs and outputs. When the value of this register I is incremented and values of the register I thus obtained are added to the IO address, state information in the input/output region can be successively read out. Access is gained to an input/output port, using IO address + the value of register I, and the content of the input/output port is stored in the register A. The value of the register A is then stored in a memory region appointed by a value of register CR + a value of register I. The register CR is a pointer for the state registers and it denotes a leading value. Therefore, state information of the IO port is stored in the memory region appointed by the value of register CR + the value of register I.

A value of register I + 1 is then stored in the register I at a step ST4. It is judged at a step ST5 whether or not the value of register I is smaller than N, and when it is smaller (YES), the process is repeated from the step ST2. While successively repeating these steps in this manner, addresses starting from IO address and ending with the (N-1)th address are read out and they are successively stored from the starting address, as appointed by the register CR.

A secondary mask pattern is created at a step ST6. This creating of a secondary mask pattern is intended to mask alarms, and a trouble which has been judged to be NSA, for example, is masked because it has no direct influence on the system. Only the trouble "AIS" needed is used. When the trouble "AIS" is caused in the system, therefore, it must be masked. Accordingly the secondary mask pattern is created.

0 is again set in the register I at a step ST7. A content of the memory region appointed by the above-mentioned value of register CR + the value of register I is stored in the register A at a step ST8. An AND logic is further calculated at a step ST9 between the value of register A and a content of a memory region appointed by MP + a value of register I, and a result thus obtained is stored in the register A. MP represents a leading address in which the value masked by the secondary mask pattern at the step ST6 is stored. A value masked by the result of this AND logic is stored in the register A.

The result or content of the register A is stored in a memory region appointed by a value of register CR2 + a value of register I. 1 is again added to the content of the register I and they are stored in the register I at a step ST11. It is judged at a step ST12 whether or not the value thus stored is smaller than N, and when it is smaller, the process is again repeated from the step ST8. Results obtained by masking state information, which has been obtained from input/output regions by the mask pattern, are thus stored successively from the pointer of the register CR2.

After the step ST12, the content of the register I is again set to 0. The above-mentioned result at the memory region appointed by the value of IO + register I value is stored in the register A at a step ST14, and the content of the register A is stored at a step ST15 in the memory region appointed by the value of register CR2 + the value of register I. Exclusive OR logic is calculated at a step ST16 between the above-mentioned value of the register A and a content appointed by a value of pointer PR2 + the value of register I, and a result thus obtained is stored in the register A. When this result is 1, it becomes apparent that a change is caused. The content of the register A is stored at a step ST17 in a memory region appointed by a value of XOR2 + register I value. XOR2 denotes a leading address in which the result obtained from the exclusive or logic is stored. The value of the register I is incremented at a step ST18 and it is judged at a step ST19 whether or not a content of the register I is smaller than N. When it is smaller than N (YES), the process is again repeated from the step ST14. According to the judgment, the above-described steps are successively repeated and it is checked-whether or not a change is caused between the secondary-masked result and data previously collected. A result thus obtained is stored in the memory region appointed by the XOR2.

The value of the register I is again set to 0 at a step ST20. A content appointed by XOR2 + the value of register I is stored in the register A at a step ST21, and it is judged at a step ST22 whether or not the content of the register A is 0. When it is not 0 or when a change is caused, a group number representing the value of the register I is set on a process instructing table (ST23). When the content in the register A is 0, the process goes to the step ST24. The process at the step ST23 is intended to carry out alarm judgment on the basis of the change group number.

1 is added to the content of the register I at a step ST24, and it is again judged at a step ST25 whether or not a content of the register I is smaller N. When it is smaller (YES), the process is again repeated from the step ST21. When the steps are repeated in this manner, a content of the trouble-causing group is stored in the process instructing table.

It is judged at a step ST26 whether or not the group stored in the process instructing table is 0, and when it is 0 or when nothing is set in the table, the process is repeated from the step ST1.

When it is not 0 (NO), alarm judgment is conducted at a step ST27 and external output is conducted at a step ST28. These alarm judgment and external output at the steps ST27 and ST28 are conducted for called every group, as shown by a flow chart in FIG. 11.

FIG. 12 is a flow chart showing the alarm judgment process. The alarm judgment is conducted for every group.

When the alarm judgment process is started, it is instructed at a step ST31 that the judgment process is to be conducted for all alarms in a group. It is judged at a step ST32 whether or not any alarm is caused while the system is working. When no alarm is caused, the process is repeated for all alarms in the group.

When an alarm is caused (YES) while the system is working, an SA flag is set ON at a step ST33 and processing conducted for all alarms in the group are instructed at a step ST34. It is judged at a step ST35 whether or not the SA flag is set ON, and when the SA flag is ON, the alarm is judged to be SA at a step ST36 if the flag is still set. When the SA flag is OFF, the alarm is judged to be NSA at a step ST37, if the flag is still set. It is compared with a current buffer at a step ST38 and when a change is caused, the current buffer is re-newed and a result thus obtained is buffered at a step ST39. When no change is caused, the step ST39 is skipped. The above-described process is conducted for all alarms in the group.

When all of the alarms in the group are judged, the process is finished.

As the data volume processed becomes larger and data processing is made at higher speeds in the above-described conventional data transmission system, the system becomes more complicated and demands higher quality. Therefore, trouble surveillance and other processes becomes significantly greater in number, and this requires them to be made at a higher speed during the idling time. Further, when the system becomes more complicated and the SA and NSA judgment process of troubles is required to have higher accuracy, the number of patterns of troubles becomes too large to be processed, if troubles have conventionally patterns and a process must be provided for every pattern. In addition, it is impossible to provide a collective judgment process including LINE and path sides to which circuits are connected. Accordingly, a simpler and more effective algorithm is required. However, it has not been proposed yet and the collective judgment process still remains impossible.

SUMMARY OF THE INVENTION

The present invention is therefore aimed at providing a trouble surveillance apparatus more suitable for use with transmission systems, capable of running at a higher speed and making the judgment process simpler, but with a higher accuracy.

According to the present invention, current-data and previous-data which are inputted into the transmission system are compared, and only when any change is found between current- and previous-data, is the trouble judgment process conducted. Therefore, the process at the idling time when no trouble change is found can be made at a higher speed and with a higher accuracy. In addition, a flag is provided for every output path and the trouble judgment process is conducted twice. Even if the system runs at a higher speed, therefore, trouble surveillance can be made with a higher accuracy.

BRIEF DESCRIPTION OF THE DRAWINGS

FIG. 1 shows which slots units are mounted in;

FIG. 2 shows troubles in the conventional units and their service affect (SA) judgment conditions;

FIG. 15 is a block diagram showing the transmission system in detail;

FIG. 17 is a flow chart showing how the embodiment of the present invention realizes the trouble judgment according to conditions;

FIG. 25 is a flow chart showing a unit redundancy process;

DETAILED DESCRIPTION OF THE PREFERRED EMBODIMENT

Figure 3:
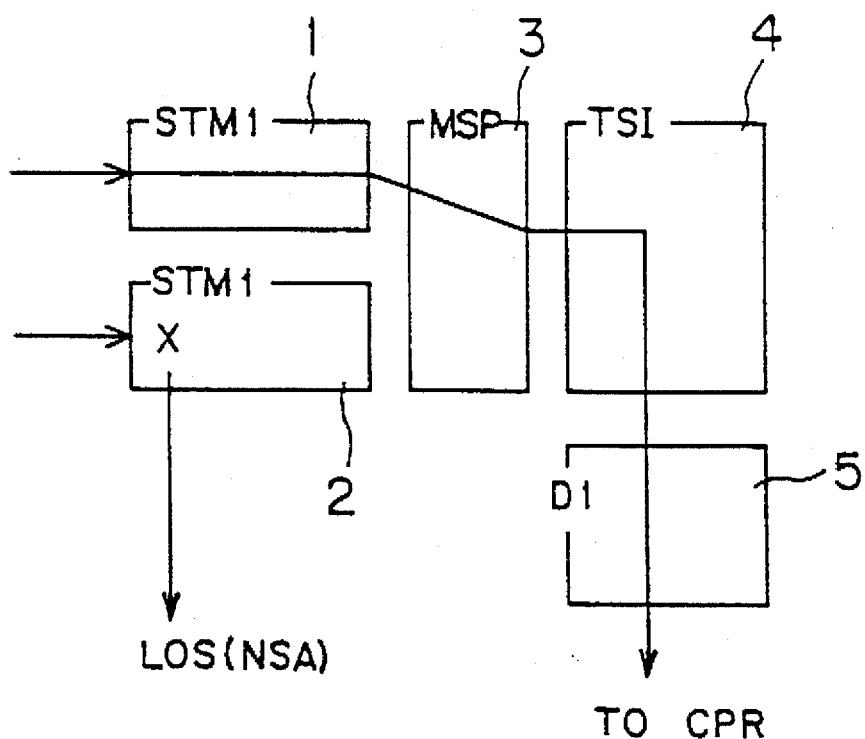
FIG. 3 shows how troubles are judged to be none service affect (NSA) when they are caused in LINE.
Figure 4:
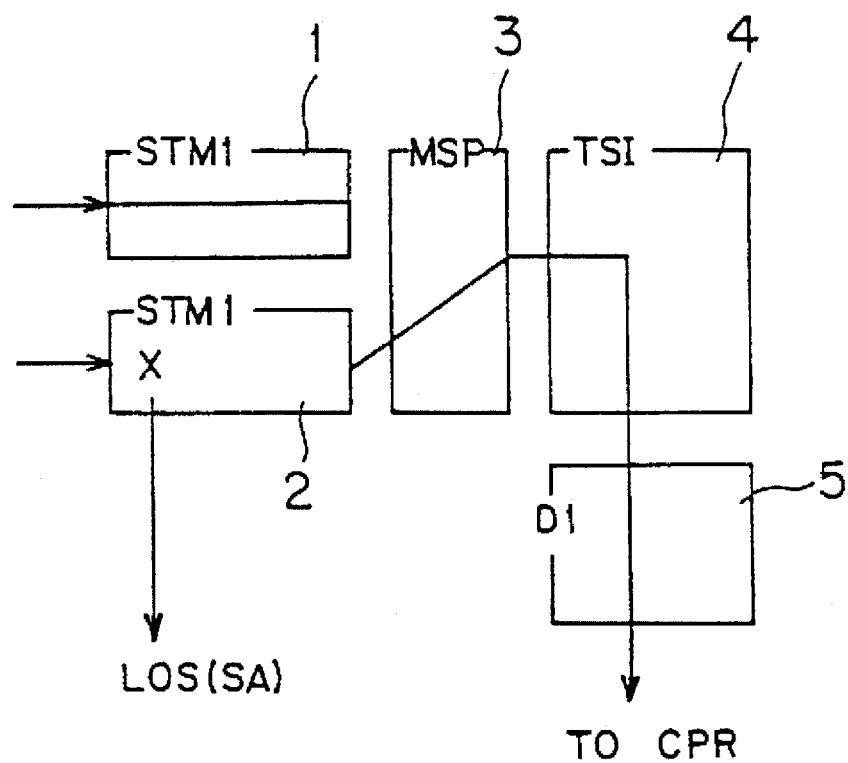
FIG. 4 shows how troubles are judged to be SA when they are caused in LINE.
Figure 5:
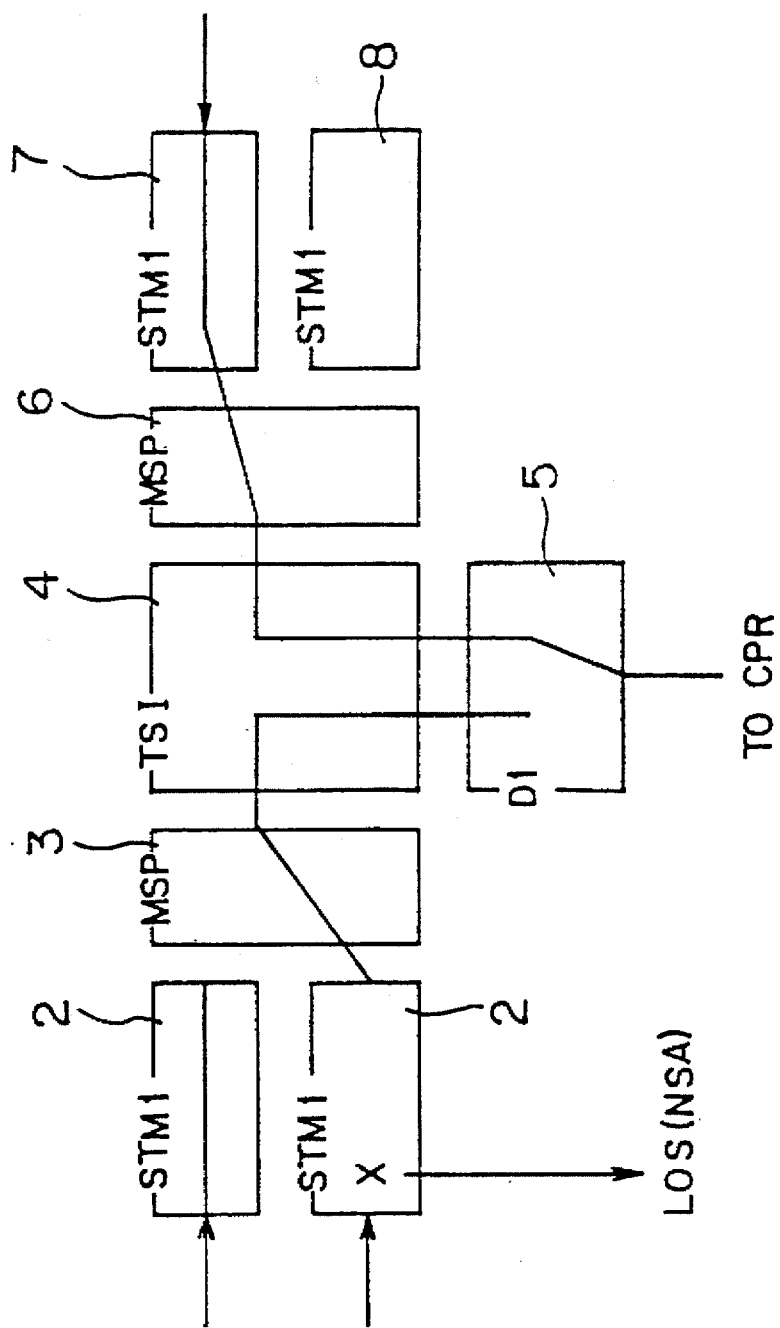
FIG. 5 shows how troubles are judged to be NSA when they are caused in a time switch interface (TSI) path.
Figure 6:
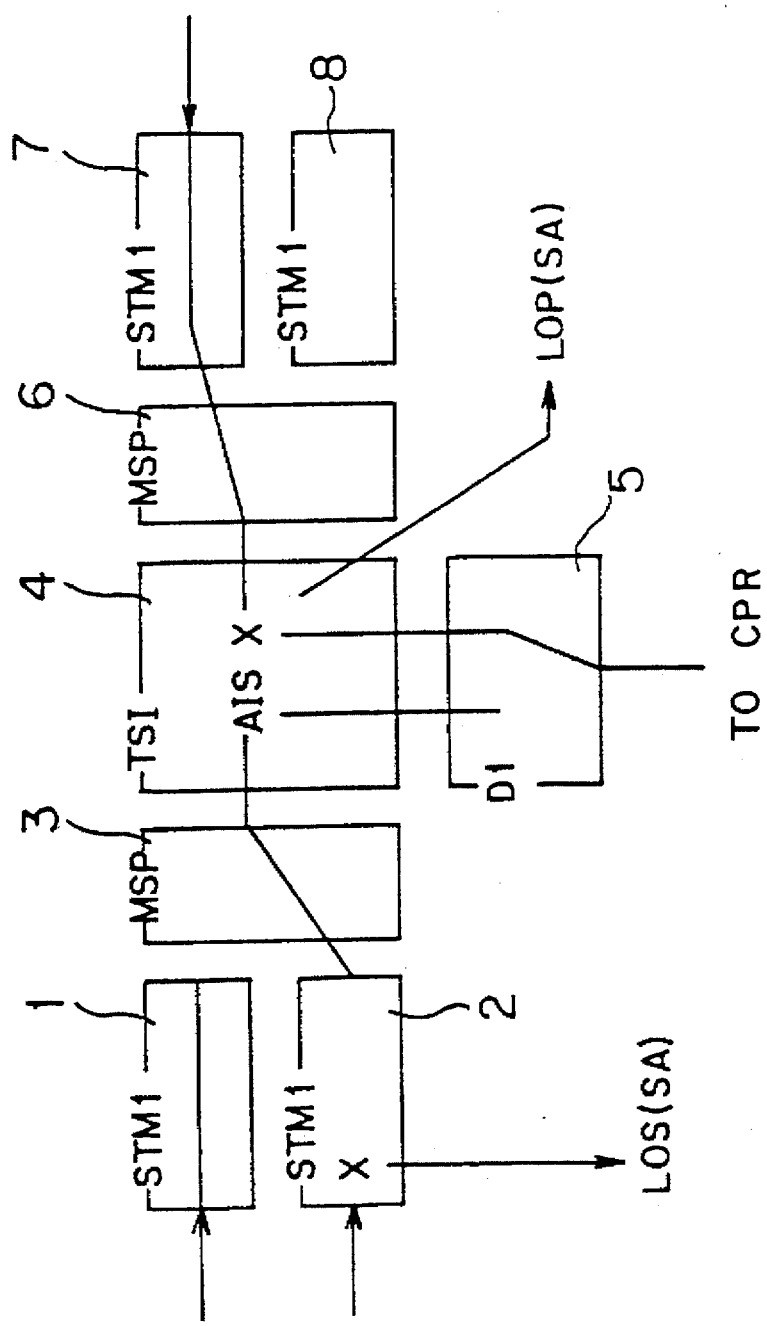
FIG. 6 shows how troubles are judged to be SA when they are caused in TSI paths.
Figure 7:
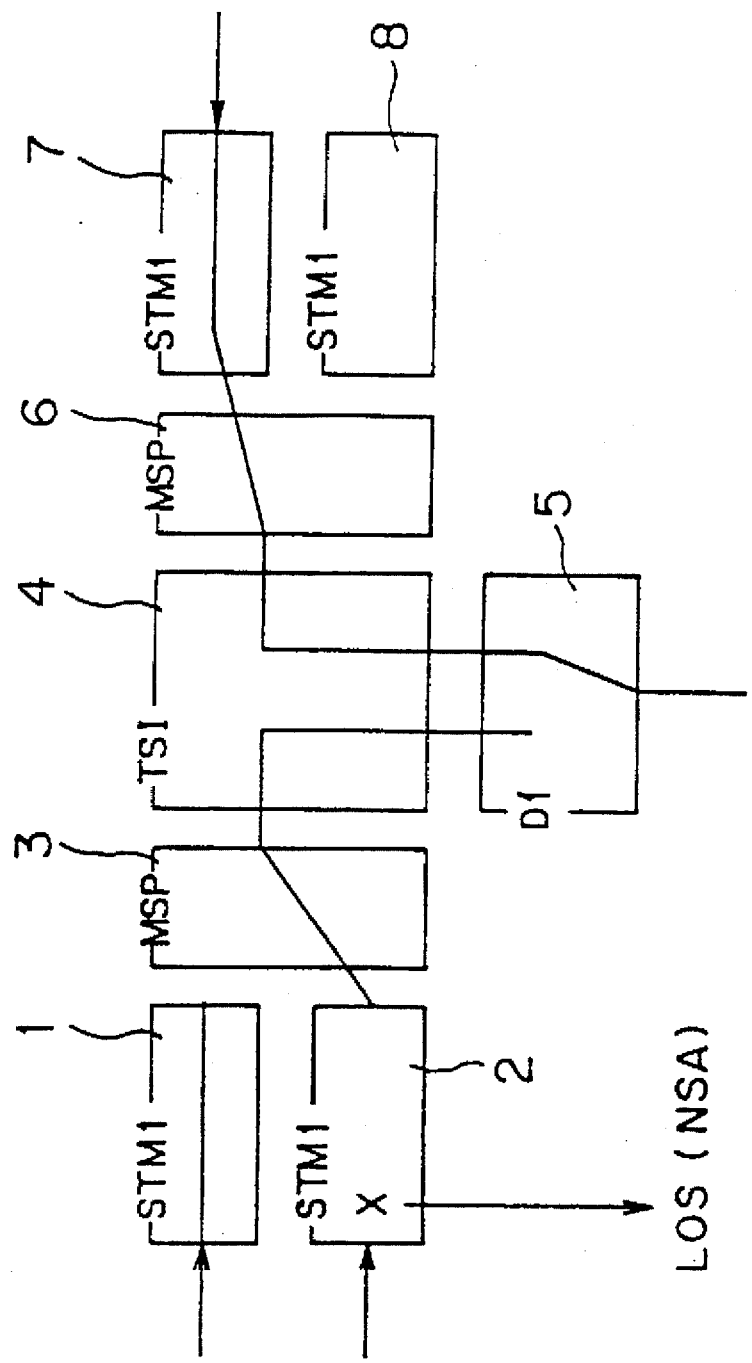
FIG. 7 shows how troubles are judged to be NSA when they are caused in a channel (CH) path.
Figure 8:
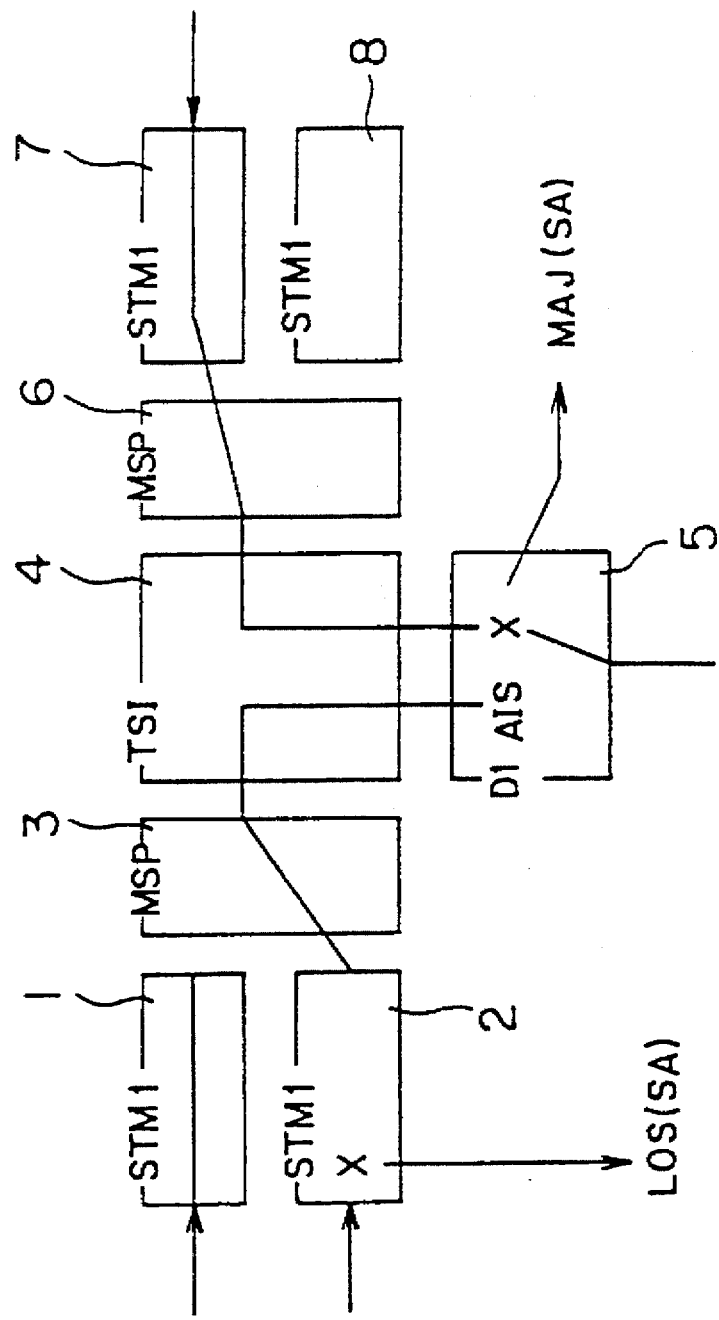
FIG. 8 shows how troubles are judged to be SA when they are caused in CH paths.
Figure 9:
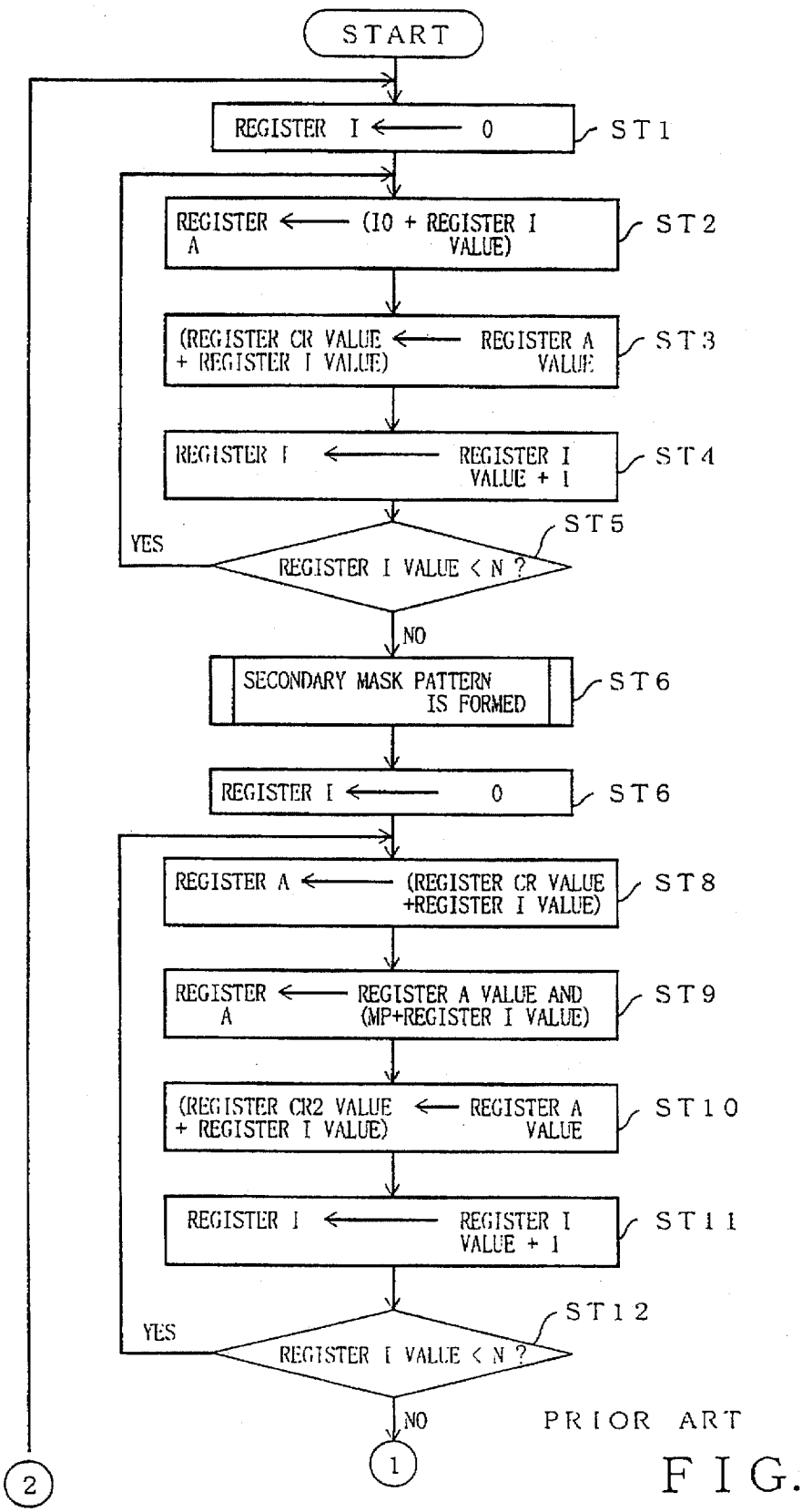
FIG. 9 is a flow chart (1) showing a conventional collection process.
Figure 10:
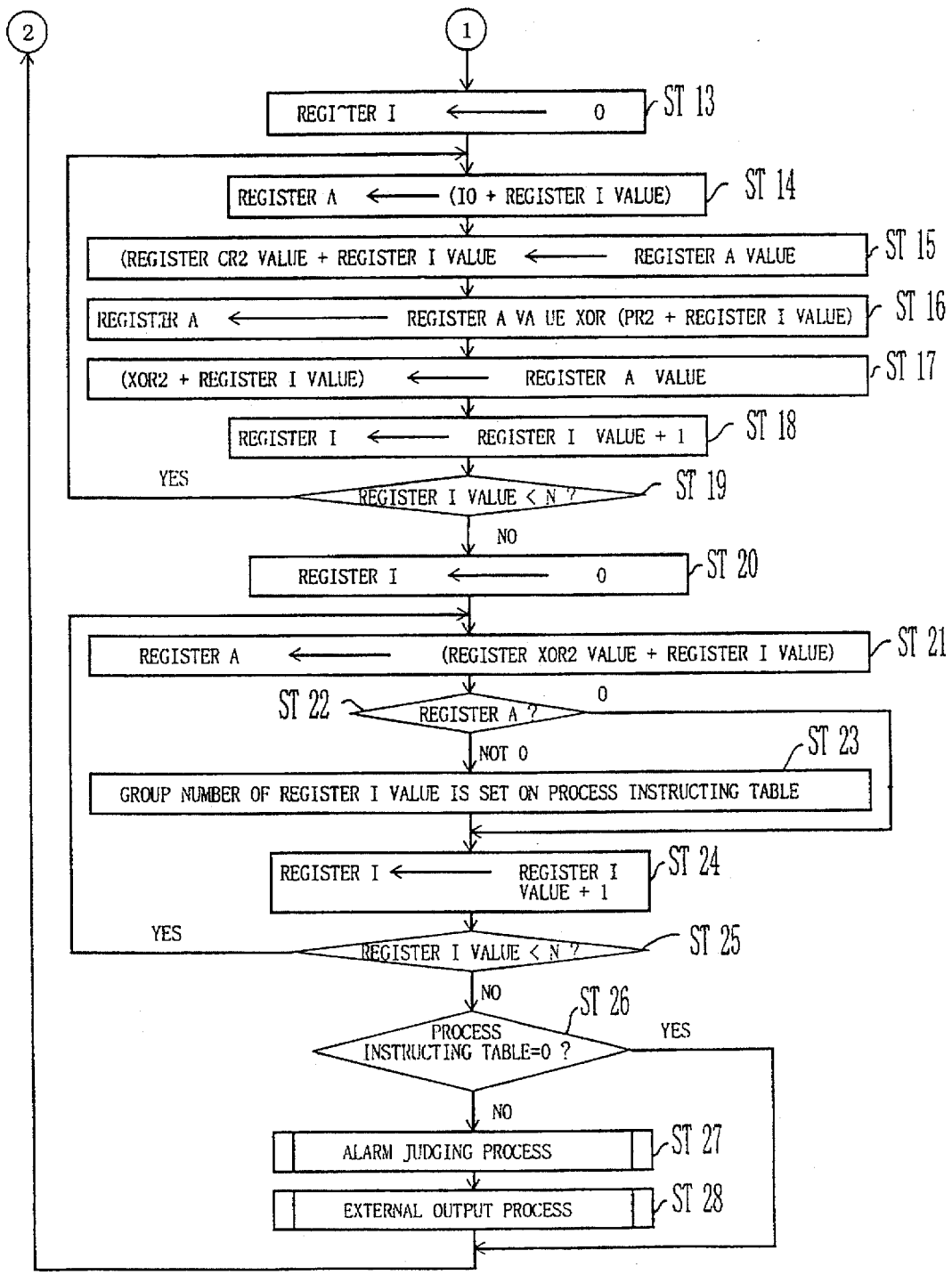
FIG. 10 is a flow chart (2) showing the conventional collection process.
Figure 11:
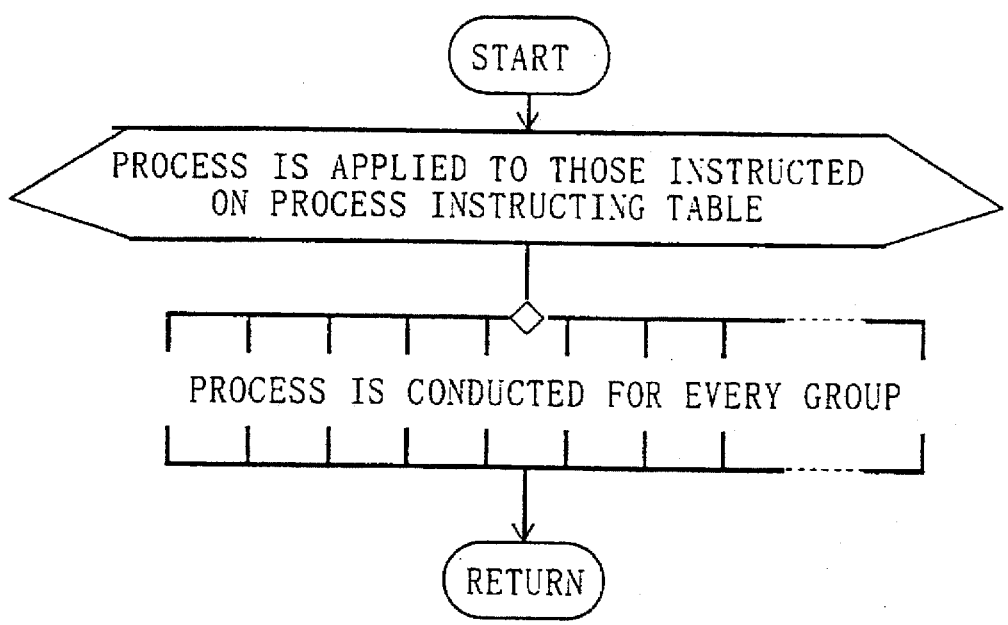
FIG. 11 is a flow chart showing a process conducted for every group.
Figure 12:
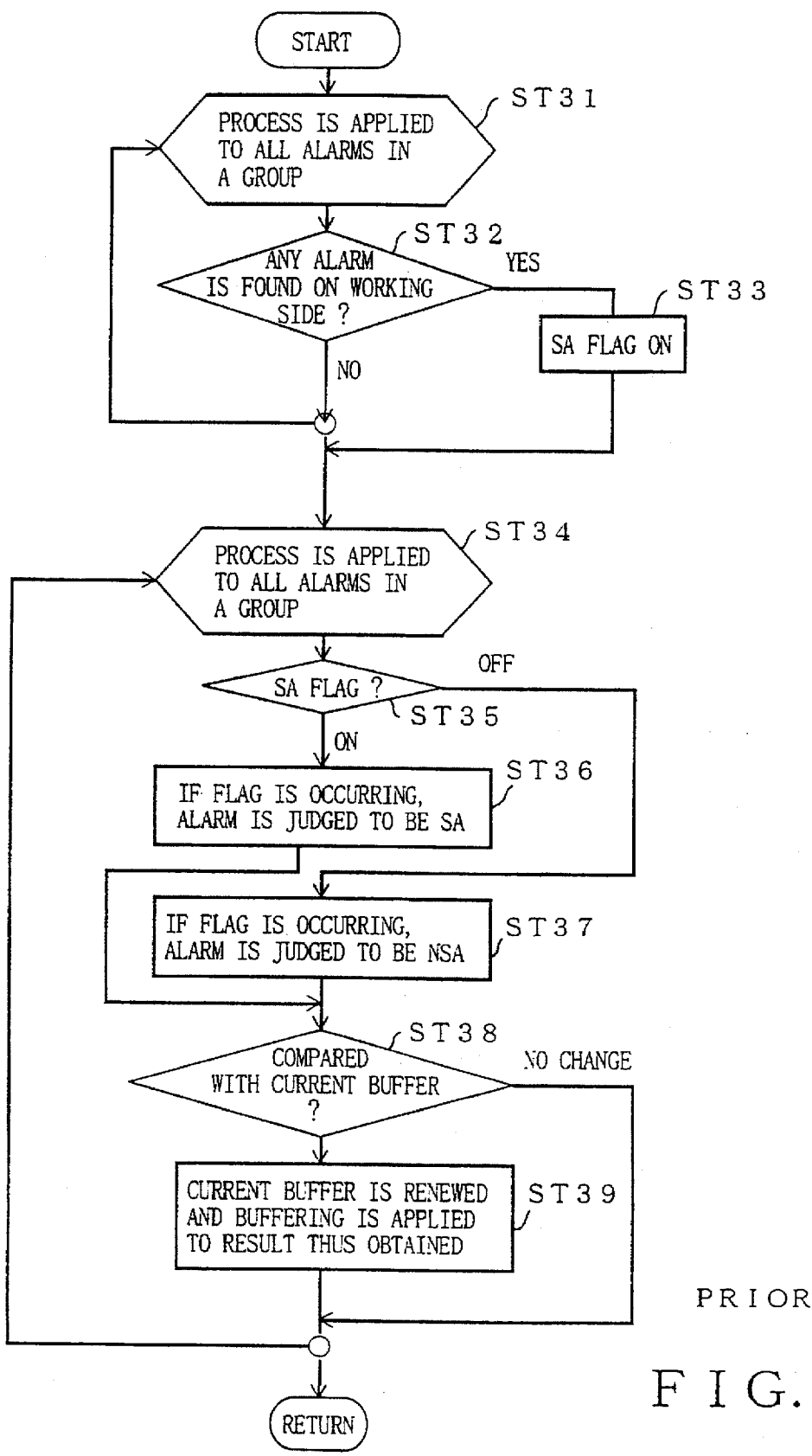
FIG. 12 is a flow chart showing an alarm judgment process.
Figure 13:
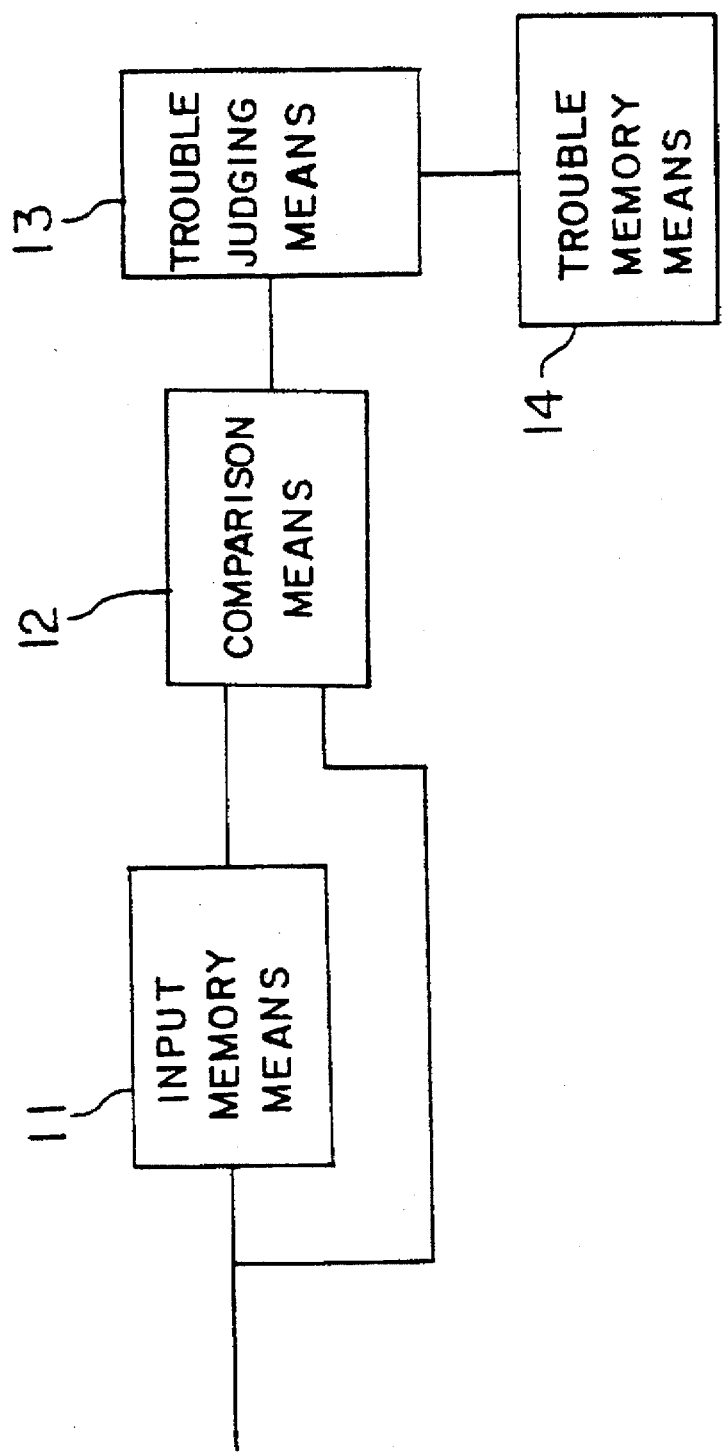
FIG. 13 is a block diagram showing a principle of the present invention.

FIG. 13 is a block diagram showing a principle of the present invention.

An input memory means 11 stores data representing a state of the transmission system.

A comparison means 12 compares data stored in the input memory means 11 and representing a previous-state of the system with data then inputted into the memory means 11 and representing a current-state of the system.

A trouble judgment means 13 judges a trouble when data compared in the comparison means 12 do not coincide with each other.

A trouble memory means 14 stores, in the form of a data link, an information data block relating to the trouble judged by the trouble judgment means 13.

In the transmission system, data after a secondary mask will never change unless any change is found in raw data representing the state of each of paths and lines. Basing on this, the secondary mask process is omitted at the idling time by comparing raw data then collected before a secondary mask with previous data.

The input memory means 11 stores data representing lines and paths in the transmission system. Every time these data are inputted, the comparison means 12 compares a current-state with the previous state stored in the input memory means 11. If the current-state is not different from the previous state, it means that the previous state is kept unchanged. Therefore, no new trouble is caused and any rectification of trouble is conducted. It is thus judged that no trouble is caused. If any change is found, the trouble judging means 13 seeks a trouble, which corresponds to the change, and causes data to be stored in the form of a link in the trouble memory means 14.

Unless a change is found in input data, the current input data is only compared with the previously-input data. The process at the idling time can be thus made at a higher speed. Even when any trouble is caused, information relating to the trouble is stored as a data link in the trouble memory means 14. Therefore, management can be conducted for every group of troubles and accordingly the process relative to grouped troubles can be made simpler.

An embodiment of the present invention will be described with reference to the accompanying drawings.

Figure 14:
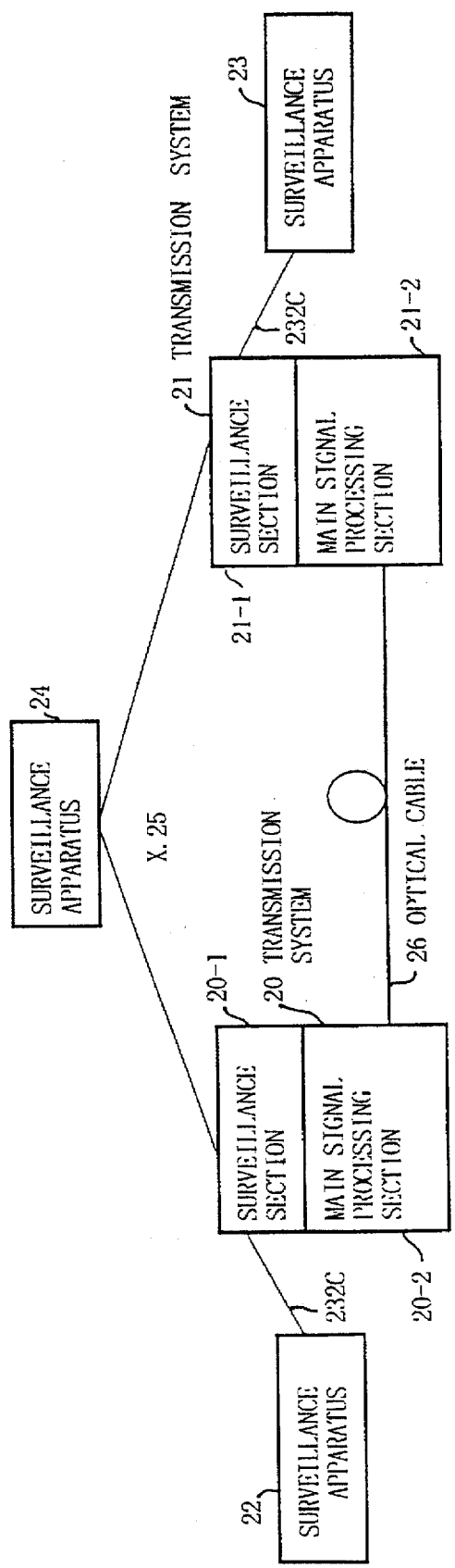
FIG. 14 is a block diagram showing an embodiment of the present invention.

FIG. 14 is a block diagram showing an embodiment of the present invention. Each of transmission systems 20 and 21 comprises a main signal processing section 20-2 or 21-2, in which main signals for electrical/optical conversion and multiple electrical signals are processed, and a surveillance section 20-1 or 21-1 which survey and control the main signal process. Surveillance sections 20-1 and 21-1 light up an LED, for example, on a unit in their transmission systems and inform surveillance apparatuses 22, 23 and 24 of the states in the systems they survey, when a trouble is caused. Surveillance apparatuses 22 and 23 are connected to transmission systems 20 and 21 through modem interfaces of RS232 type, for example, to inform the system operator of the states only in their connected associate transmission systems, respectively. They may be personal computers, for example. The surveillance apparatus 24 surveys a plurality of transmission systems 20 and 21, and it is usually called an integrated surveillance apparatus, for which a work station, for example, may be used. It is connected to the transmission systems through subscriber interfaces X.25. The transmission systems 20 and 21 are connected to each other through an optical cable 26.

The surveillance sections 20-1 and 21-1 of the transmission systems 20 and 21 survey troubles in the main signal treatment sections 20-2 and 21-2 at all times, and they judge according to steps, which will be described later, whether these troubles are SA or NSA. They also survey those troubles which are not judged to be SA or NSA.

FIG. 15 is a block diagram showing the transmission system 20 in more detail. The other transmission system 21 has same arrangement as that of the transmission system 20.

As described above, the transmission system 20 includes the surveillance section 20-1 and the main signal processing section 20-2, and these sections are connected to each other through a bus 20-3. The surveillance section 20-1 comprises a CPU 30, a ROM 31 and a RAM 32 which are connected to the bus 20-3. A surveillance program is stored in the ROM 31 and the CPU 30 executes the program to survey states in transmission units 33–35 connected to the bus 20-3. The RAM 32 is a region which is used as a working area, by the CPU 30.

The transmission units 33–35 of the main signal processing section 20-2 are connected to the bus 20-3, and the CPU 30 surveys them as a unit. They are arranged at an I/O region of the bus 20-3 and the CPU 30 judges their states by while gaining access to the I/O region. As will be described later, it is judged in this example whether or not states in the transmission units 33–35 are changed, and when any change is found, it is judged that abnormal troubles have been caused and that troubles have been rectified. In short, the surveillance sections 20-1 and 21-1 conduct collection, secondary mask, data link, alarm judgment and external output processes. These processes will be described below.

Figure 16:
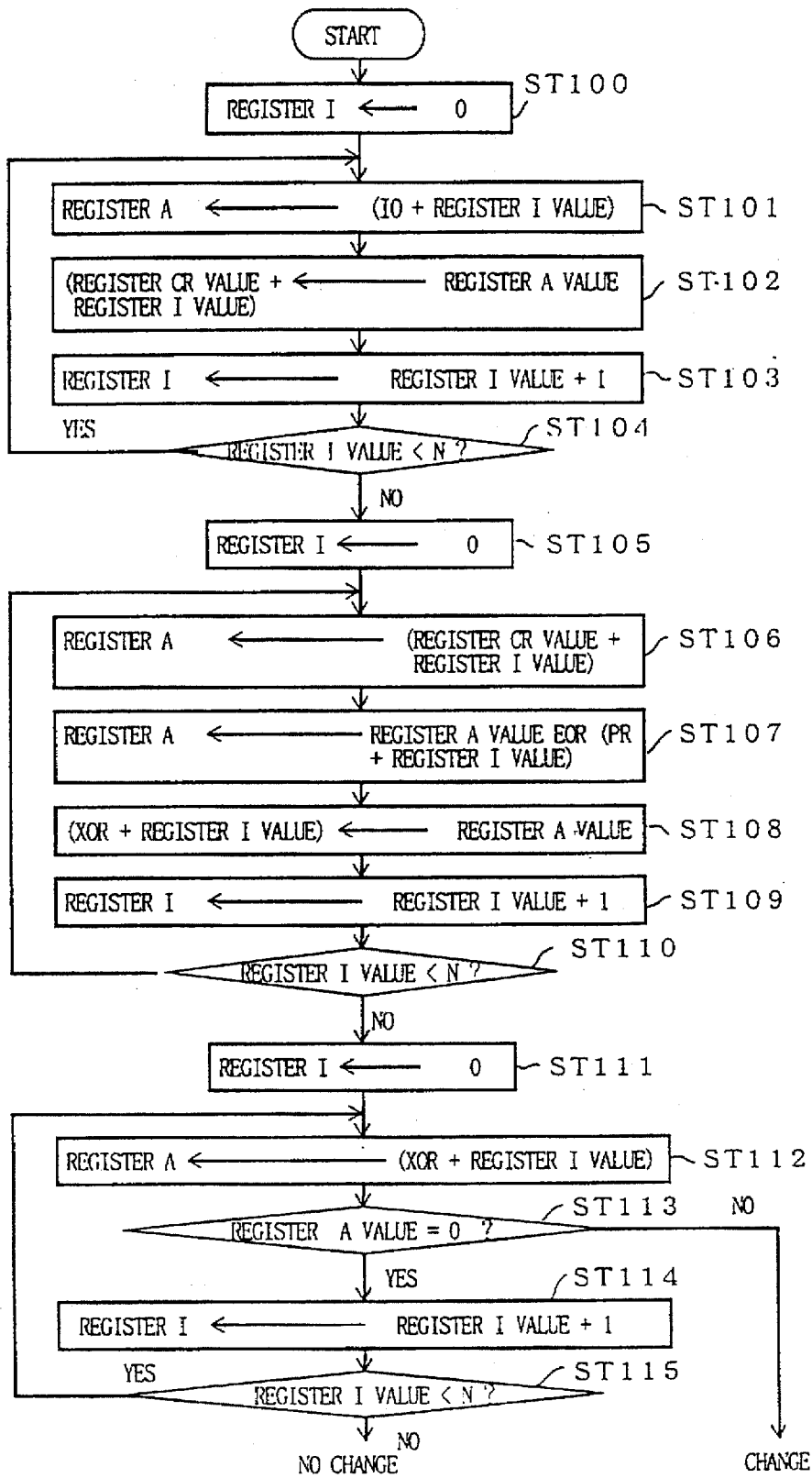
FIG. 16 is a flow chart showing how the collection process is performed by the embodiment of the present invention.

FIG. 16 is a flow chart showing the collection process conducted by the embodiment of the present invention. In FIG. 16, it is judged whether or not states in the transmission units 33–35 shown in FIG. 15 are changed. When the process is started, a content of in the register I is set to 0 at a step ST100. Access is gained, as a step ST101, to an input/output region appointed by a value of address IO + a value of register I, and a result thus obtained is stored in the register A. IO represents a leading address whose input/output circuit is addressed. The content of the register A is stored at a step ST102 in a memory appointed by a value of register CR + the value of register I, that is, in the working region of the RAM 32. 1 is added to the content of in the register I and a result thus obtained is stored in the register I at a step ST103. It is judged at a step ST104 whether or not the value of the register I is smaller than N. When it is smaller than N (YES), the process is again repeated from the step ST101. When it is not smaller (NO), the content of in the register I is again set to 0 at a step ST105, and the content of in the memory region appointed by the value of register CR + the value of register I, is stored in the register A at a step ST106.

The above-described process at steps ST100–104 is intended to read state information from the IO region, and successively store it in the memory region of the RAM 32 appointed by the value of the register CR. When the process at the step ST106 is then executed, the data thus read is stored in the register A. An exclusive "OR" is calculated at a step ST107 between the value of the register A and a content appointed by a value of address PR + a value of register I, and a result thus obtained is stored in the register A. PR represents a leading address in which the previous state information is stored, and it is found from the exclusive "OR" whether or not the previous state information is different from the current state information. The process at the step ST107 is not limited to the exclusive "OR" but it may be a comparison. The content of the register A or the result obtained by the exclusive "OR" is stored at a step ST108 in a memory region of the RAM 32 appointed by a value of address XOR + a value of register I, a result obtained by adding 1 to the content of in the register I is stored at a step ST109 in the register I, and it is judged at a step ST110 whether or not the content of the register I is smaller than N. When it is smaller, the process is repeated from the step ST106. XOR denotes a leading address in which the result obtained by the exclusive "OR" is stored.

The results obtained from the step ST100 to the step ST104 are taken from the memory region appointed by the value of the register CR and stored in the RAM 32. Information whose leading address of the memory region is appointed by the address PR read out at the step ST107 is previous information, and information whose leading address is appointed by the value of the register CR obtained from the step ST100 to the step ST104 is used as a subsequent value of the address PR. It is checked from the step ST105 to the step ST110 whether or not any change is found, and the result thus obtained is stored in a region appointed by the address XOR.

The content of the register I is again set to 0 at a step ST111, information appointed by the value of address XOR + the value of register I is stored in the register A at a step ST112, and it is checked at a step ST113 whether or not the value of the register A is 0. When it is 0 (YES), 1 is again added to the value of the register I at a step ST114, it is judged at a step ST115 whether or not the content of the register I is smaller than N, and when it is smaller (YES), the process is repeated from the step ST112.

A series of these steps are repeated and it is concluded that no change is found when the content of the register I is N. When the value of the register A is not 0 (NO at the step ST113), it is decided a that change is caused.

According to the above-described embodiment of the present invention, common state changes are checked. Therefore, the process can be made simpler because the mask process and others are made unnecessary. In addition, a state flag is provided while taking an output line and a channel as a unit. Trouble judgment can be therefore made, basing only on the trouble-caused line, the redundant state of a channel and the flag of a connected associate.

FIG. 17 is a flow chart showing the trouble judgment process. When the process is started, it is judged at a step ST120 whether or not the flag is 1. When the flag is 1 (YES), a target alarm is judged to be SA, and the flag of a connected associate is further set to 1 (step ST121). It is judged at a step ST122 under a condition 2 whether or not a path is redundant. FIG. 17 shows a trouble-caused case and when the path is not redundant, the step ST121 is executed and the target alarm is judged to be SA. When the path is redundant (YES), it is checked whether or not the path is being used, and when it is being used, the alarm is judged at the step ST121 to be SA. When it is not being used, the alarm is judged to be NSA.

Figure 18:
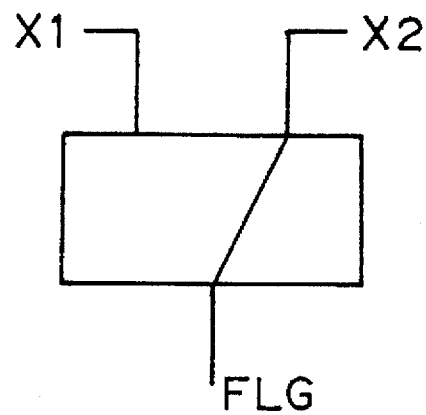
FIGS. 18A, 18B and 18C show how judgment is conducted.
Figure 18:
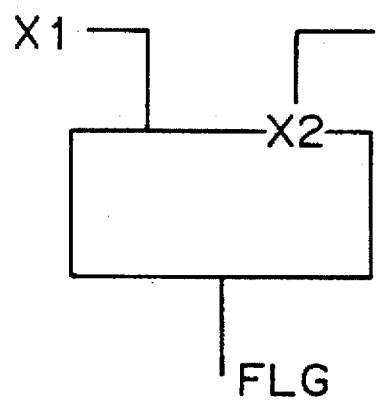
Figure 18:
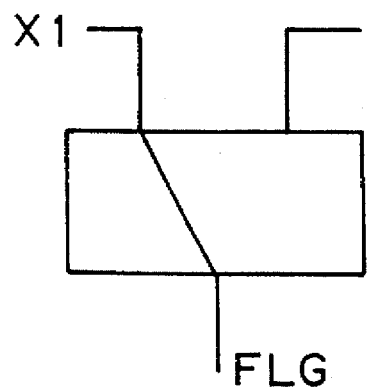

The above-described judgment is sequentially conducted twice when a trouble is caused, and if the first flag is 1 and the flag of a connected associate is 1, the second flag becomes 1 and the trouble is judged to be SA. When a plurality of troubles are caused, for example, the process is conducted twice relative to each of the troubles. A specific pattern can be thus obtained, thereby making it unnecessary to use the conventional complicated judgment process. FIGS. 18A, 18B and 18C are intended to explain the above-described trouble judgment. Devices used in these Figures are D1 units, for example. A trouble in FIG. 18(a) will be described first.

When the flag is 0 (it is set to 0 at the first check), it is judged about a trouble X1 whether or not the flag of a connected associate on a trouble-X1-caused LINE is 1 (condition 1). The answer is NO. It is also judged whether or not the path is redundant (condition 2). This is decided by the internal system arrangement. The answer is YES in this case. It is also judged whether or not the path is being used (condition 3). The path is not being used, so the answer is NO. In the case of the trouble judgment process shown in FIG. 17, therefore, the trouble X1 caused is once judged to be NSA. On the other hand, same process is conducted about a trouble X. Namely, it is judged whether or not the flag of a connected associate on a trouble-X2-caused LINE is 1 (condition 1), and the answer is NO because the flag is not 1.

It is then judged whether or not the path is redundant (condition 2). The answer is YES because the path is redundant. It is further judged whether or not the path is being used (condition 3). The answer is YES because the path is being used in this case. Therefore, the trouble X2 is judged to be SA and the flag is set to 1. The same process is again conducted for the troubles X1 and X2. The flag is 1 because of the trouble X2 is caused downstream of the trouble X1 and on the trouble-X1-caused LINE. Therefore, the trouble X1 is judged to be SA. It is then judged about the trouble X2 whether or not the flag of the connected associate on the trouble-X2-caused LINE is 1. The answer is YES. Therefore, the trouble X2 is also judged to be SA.

Another trouble shown in FIG. 18B will be described. After the flag is set to 0, the above-described process is conducted for a trouble X1 under conditions 1, 2, and 3. It is judged whether or not the flag of a connected associate on a trouble-caused LINE is 1 (condition 1). The answer is NO. It is then judged whether or not the path is redundant (condition 2). The answer is YES. It is further judged whether or not the path is being used (condition 3). The answer is NO, because the path is directed in the direction of X2. Therefore, the trouble X1 is judged to be NSA. The same process is conducted about a trouble X2. The answers are NO in condition 1, YES in condition 2, and YES in condition 3 in this case. Because the path is being used under condition 3, the trouble X2 is judged to be SA and the flag is set to 1.

The above process is again conducted. The trouble X1 is caused under condition 1 and it is judged whether or not the flag of a second connected associate is 1 (condition 1). The answer is YES. The trouble X1 is thus judged to be SA. Further, it is judged whether or not the flag of a connected associate on a LINE on which the trouble X2 is caused under condition 1 is 1 (condition 1). The first time answer was YES. Therefore, the trouble X2 is judged to be SA.

A case shown in FIG. 18C will be described.

The flag is not set. The answers are NO in condition 1, YES in condition 2, and YES in condition 3. The trouble X1 is thus judged to be SA.

The process is again conducted for about the trouble X1. The answer is YES in this case when it is judged under condition 1 whether or not the flag of the connected associate on the trouble-X1 caused LINE is 1. Therefore, the trouble X1 is also judged to be SA.

The above-described judgment is conducted under conditions shown in FIG. 17, relating to each of troubles X1 and X2, and it is again repeated relative to each of them. SA and NSA judgments can be thus made more accurately.

Although not shown in FIG. 17, the flag is set to 0 when the process shown in FIG. 17 is to be conducted made, and the process is twice conducted. This enables SA and NSA judgments to be achieved.

As described above, it is judged that no trouble is caused when no change is found in an input/output state. When any change is found, it is judged what the trouble is, that is, it is judged whether it is NSA or SA.

Figure 19:
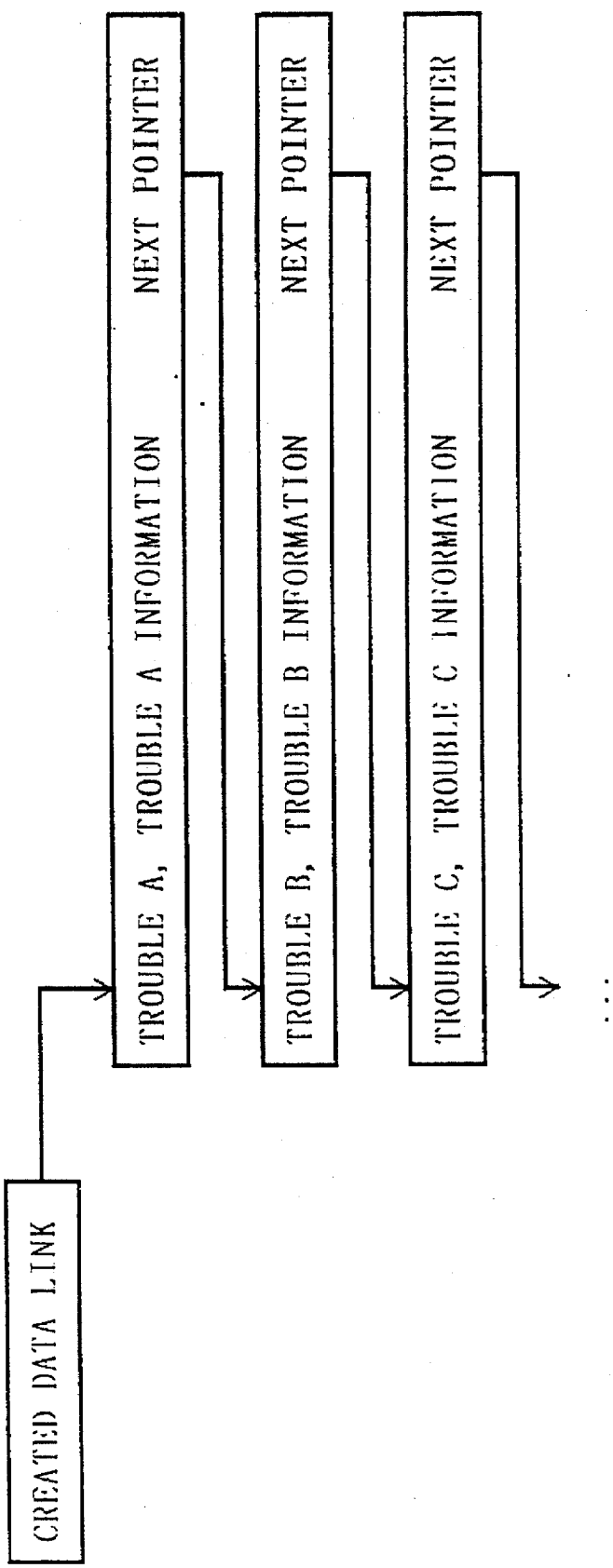
FIG. 19 is a flow chart showing how troubles are processed by the embodiment of the present invention.

According to the embodiment of the present invention, processes relative to troubles are not grouped in a class, but only troubles currently caused are temporarily treated. FIG. 19 shows how data links are created relative to troubles.

Conventionally, the states of all troubles caused in a group were checked, but according to the present invention, troubles are only temporarily treated without grouping them in a class. In short, data links are created relative to troubles currently caused. When a trouble A is caused as shown in FIG. 19, a link is started from an address in which trouble A information is stored. When another trouble B is present in addition to trouble A information, an address in which the trouble B has been stored is stored in a next pointer. Trouble B information is thus stored in a region appointed by the next pointer of trouble A information. When a further trouble information is present in addition to troubles A and B, its address is stored in a next pointer of the information. Namely, the trouble C is stored in a region appointed by the next pointer of the trouble B. When a still further trouble is present in addition to trouble C information, its address is similarly stored in a next pointer. When links are successively created in this manner, troubles can be managed by these links thus created. In short, management is established only relative to troubles currently caused.

According to the trouble surveillance apparatus of the present invention, it is judged whether or not a trouble is caused, it is then judged whether the trouble is SA or NSA, and a data link is created to treat the trouble. These processes cannot be found in any conventional cases and they are quite new in treating troubles caused in transmission systems.

Figure 20:
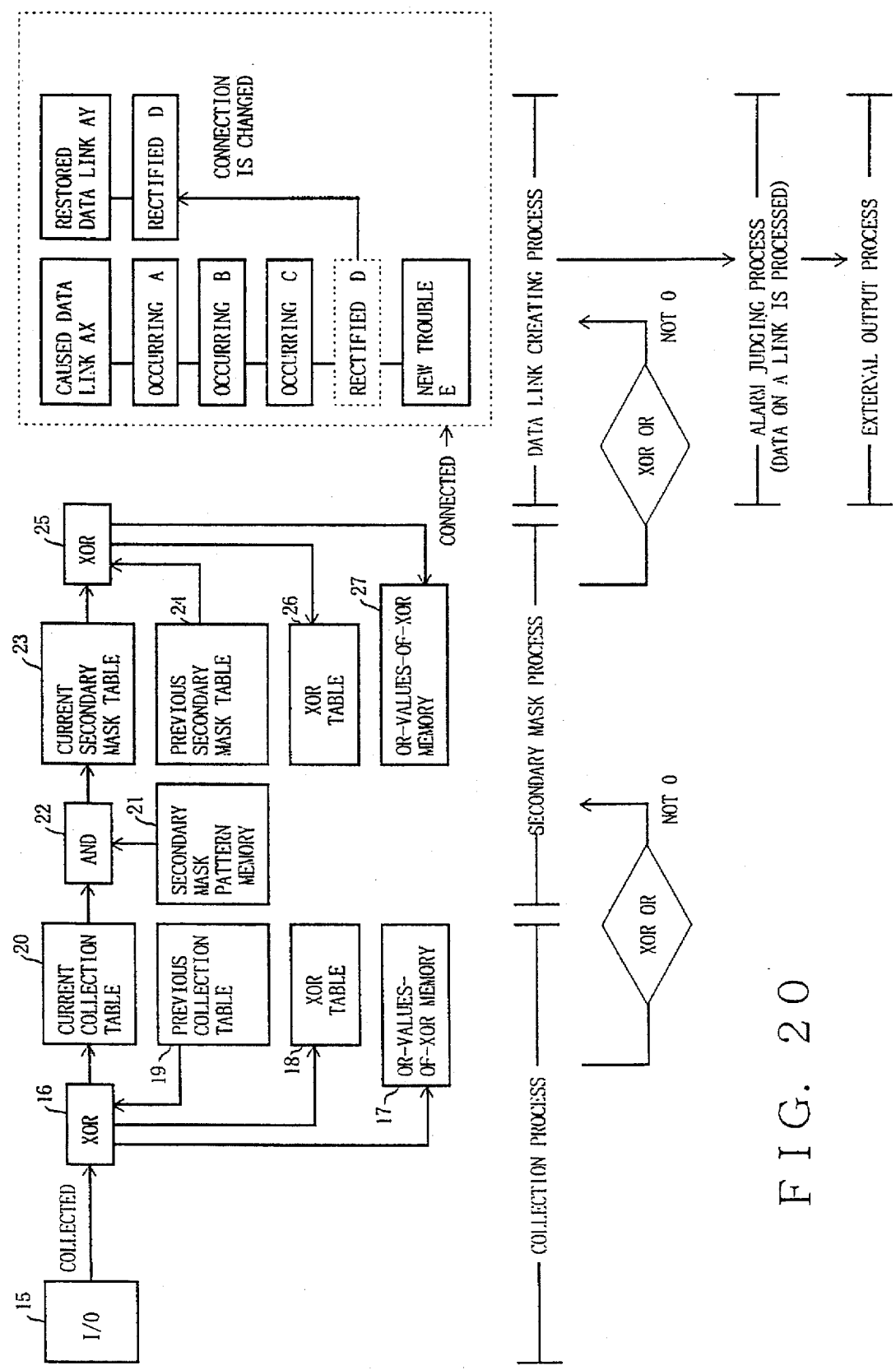
FIG. 20 shows all of the processes conducted for troubles.

FIG. 20 is intended to explain all of the processes to treat troubles. When state information of the transmission system is collected through an input/output circuit (I/O) 15, an exclusive "OR" circuit 16 reads out information from a previous collection table 19 in which information collected previously is stored, and it calculates an exclusive "OR" between the information read and the state information currently collected through the input/output circuit (I/O) 15. A result thus obtained is stored in an XOR table 18 and an "OR" addition of the result is stored in an OR-value-of-XOR memory 17.

Further, the information currently collected is stored in a current collection table 20. When 0 is stored in the OR-value-of-XOR memory 17 in this collection process, it represents that no change is found in the state kept previously. When this value is 0, it is decided that no trouble is caused and the collection process is stopped.

When the value in the OR-value-of-XOR memory 17 is not 0 but 1, the secondary mask process is conducted. An "AND" is calculated between information stored in a secondary mask pattern memory 21 and the information currently collected in the current collection table 20 through an "AND" circuit 22, and it is stored in a current secondary mask table 23. An exclusive "OR" is calculated between the information currently stored in the current secondary mask table 23 and information stored previously in a previous secondary mask table 24 through an exclusive "OR" circuit 25, and a result thus obtained is stored in an XOR table 26, and an "OR" addition of the result is stored in an OR-value-of-XOR memory 27. When the content of in this OR-value-of-XOR memory 27 is 0, a next step is omitted.

When the content of the memory 27 is not 0, the data link creation process is conducted. In the case of results obtained by the data link creation process, information indicated by a data link AX instructs an occurring trouble A relative to an occurring data link AX. The occurring trouble A has its trouble information and a next pointer, and it indicates here an occurring trouble B. The occurring trouble B, an occurring trouble C, a rectified trouble D and a new trouble E, are successively indicated. When the occurring trouble D denoted by signal information becomes rectified, the rectified D is pointed relative to a restoring data link AY and this link is canceled by the occurring date link AX. When it is judged by the above-described secondary mask process that a trouble is caused, for example, information of the new trouble E is linked to the last position of the occurring data link AX. After the data link creation process is conducted in this manner, data on the link are processed by the alarm judgment process and the external output process is then conducted relative to them.

Although a flow of all processes has been described in FIG. 20, each of these processes will be described in detail.

Figure 21:
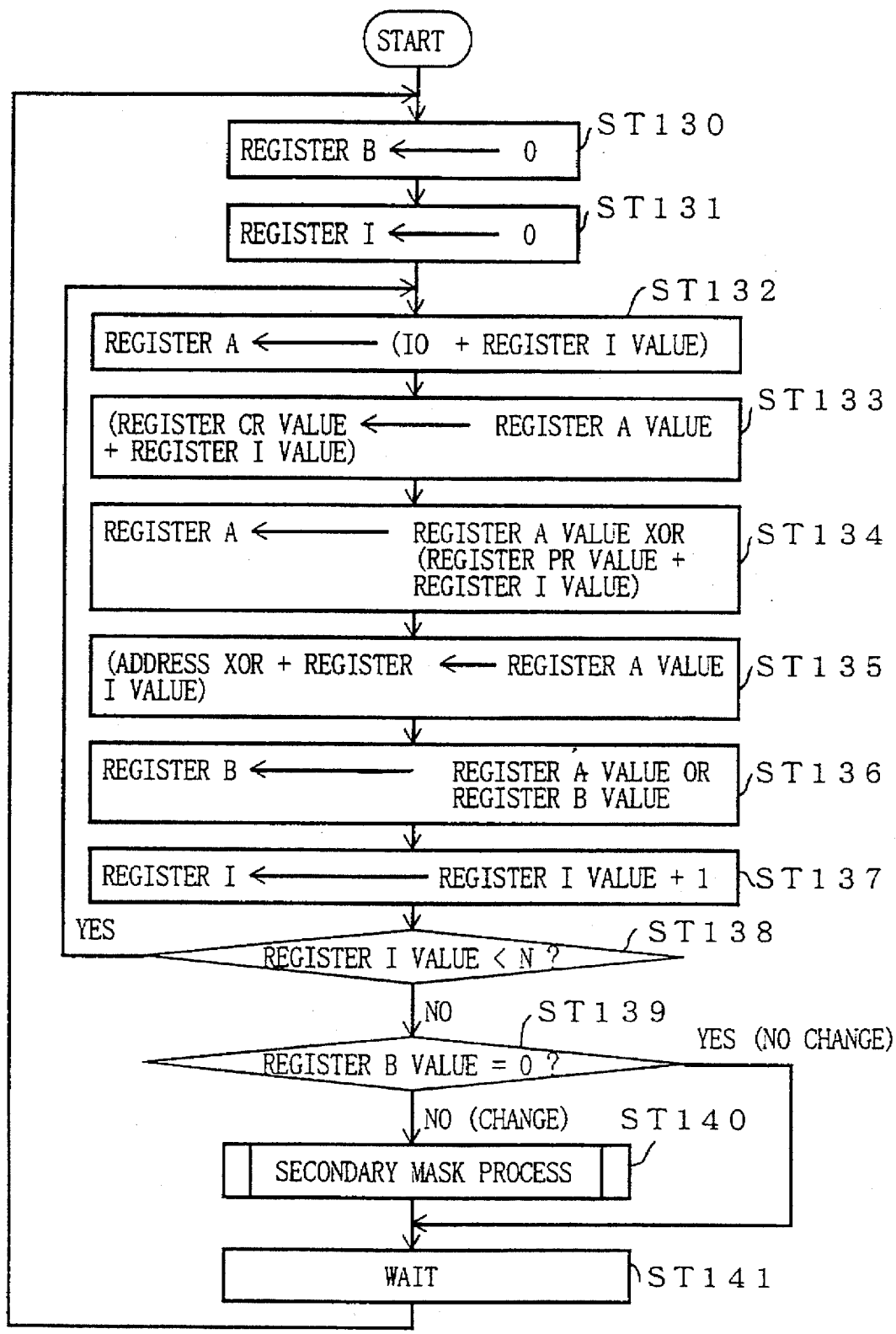
FIG. 21 is a flow chart showing a collection process.

FIG. 21 is a flow chart showing the collection process. When the collection process is started, the content of the register B is set to 0 at a step ST130. The content of the register I is then set to 0 at a step ST131. The content of a memory region appointed by a value of IO + a value of register I is read out and stored in the register A at a step ST132. The content stored in the register A is stored in a memory region appointed by a value of register CR + a value of register I at a step ST133. An exclusive "OR" is calculated between the value of the register A and a content of a memory region appointed by a value of register PR + a value of register I, and stored in the register A at a step ST134. The value of the register A is stored at a step ST135 in a memory region appointed by a value of address XOR + a value of register I. An "OR" is calculated between the value of the register A and a value of the register B and a result thus obtained is stored in the register B at a step ST136. 1 is added to the content of the register I and a result thus obtained is stored in the register I at a step ST137. It is then judged at a step ST138 whether or not the value in the register I is smaller than N. When it is judged to be smaller at the step ST138, the process is repeated from the step ST130.

In the already-described flow of the collection process according to the present invention, the storing of data, the calculating of exclusive "OR" and the judging of whether or not any trouble is caused, have been conducted not for every access, but relative to a series of addresses IO. In the collection process shown in FIG. 21, however, the storing of information to be used next, the comparing of a value currently obtained with the value obtained previously (or exclusive "OR"), and the judging of whether or not any change is found (or whether or not any trouble is caused) are successively conducted for every reading. When steps ST132–ST138 are executed, therefore, 0 or other values are stored in the register B. 0 represents that no change is found. When it is checked whether or not the value in the register B is 0, therefore, it can be judged whether or not any trouble is caused. In the flow chart of the collection process shown in FIG. 21, therefore, it is checked at a step ST139 whether or not the value of the register B is 0. When it is 0 (YES), it is judged that no change is found. When it is not 0 (NO), it is judged that change is found and the secondary mask process is conducted at a step ST140. A WAIT process is then conducted at a step ST141 and the collection process is repeated from the step ST130.

When the value in the register B is judged not to be 0 at the step ST139, it represents that a trouble is caused and that the trouble is rectified. The secondary mask process is used to make these judgments.

When the above-mentioned steps and processes are conducted, the collection process is executed.

Figure 22:
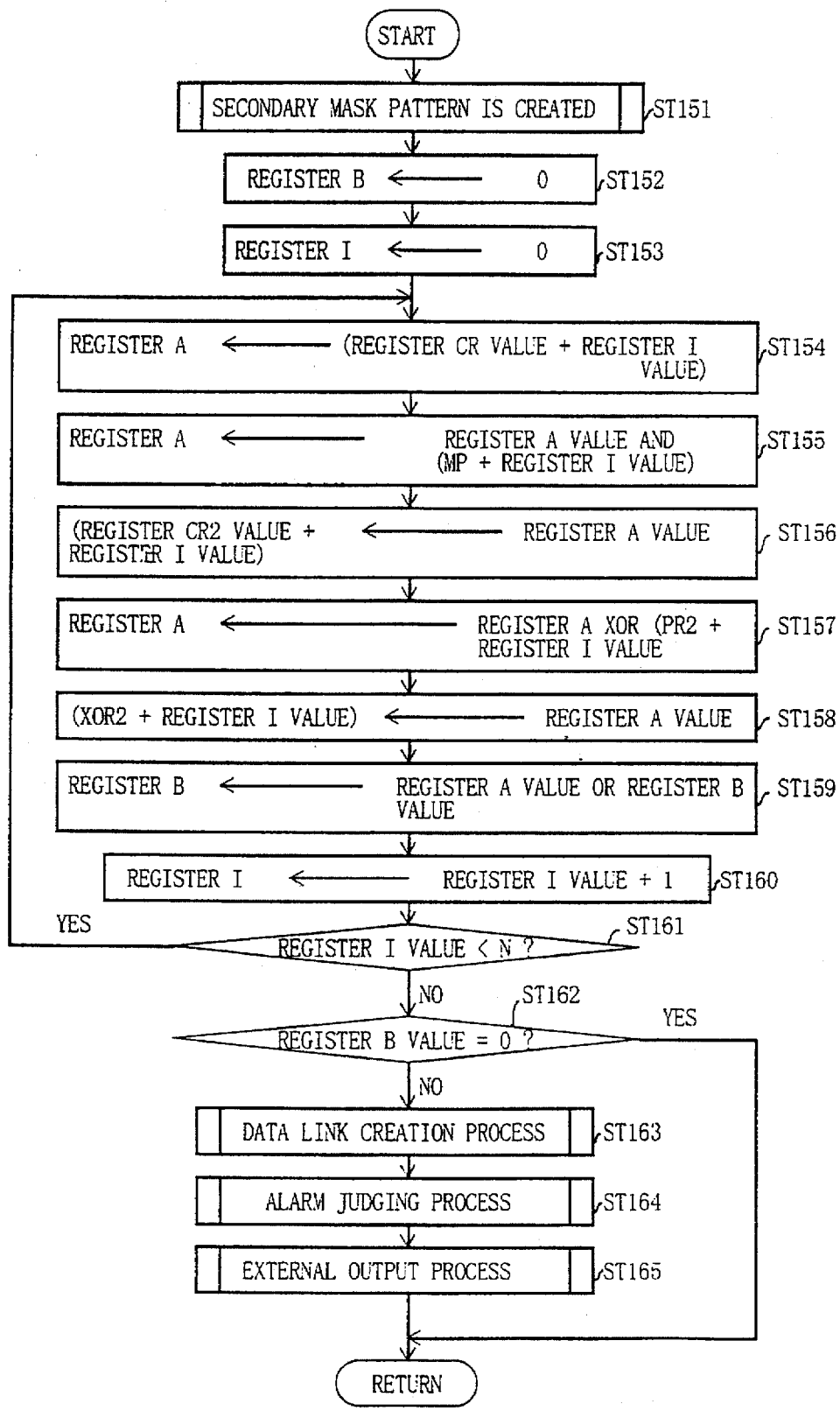
FIG. 22 is a flow chart showing a secondary mask process.

FIG. 22 is a flow chart showing the secondary mask process in the above-described collection process. When the secondary mask process is started, a secondary mask pattern is created at a step ST151. This secondary mask pattern creating step is same as the conventional one. The content of the register B is set to 0 at a step ST152 and the content of the register I is also set to 0 at a step ST153. The value of register CR + the value of register I which has been obtained by the above-described collection process is stored in the register A at a step ST154, and an "AND" is calculated at a step ST155 between the value in the register A and MP + a value of register I. A result thus obtained is stored at a step ST156 in a memory region appointed by a value of register CR2 + a value of register I. Further, an exclusive "OR" is calculated at a step ST157 between the value in the register A and a result obtained by the previous mask pattern, and a result thus obtained is stored at a step ST158 in a memory region appointed by a value of XOR2 + a value of register I.

An inclusive OR is calculated at a step ST159 between the value in the register A and the value in the register B, and a result thus obtained is stored in the register B. 1 is added to the content of the register I at a step ST160 and it is judged at a step ST161 whether or not the content of the register I thus obtained is smaller than N. When it is smaller (YES), the process is repeated from the step ST154.

On the other hand, it is judged at a step ST162 whether or not the value of the register B is 0 when the content of the register I is not smaller than N (NO). When the value of the register B is 0, it represents that no trouble is caused at the time when the mask pattern is created. Accordingly the process is finished.

When the value of the register B is not 0 (NO), trouble information is stored at a step ST163 by the data link creation process. The alarm judgment process is then conducted at a step ST164. Further, the external output process is applied at a step ST165 to a result thus obtained. All of the processes are thus finished.

Figure 23:
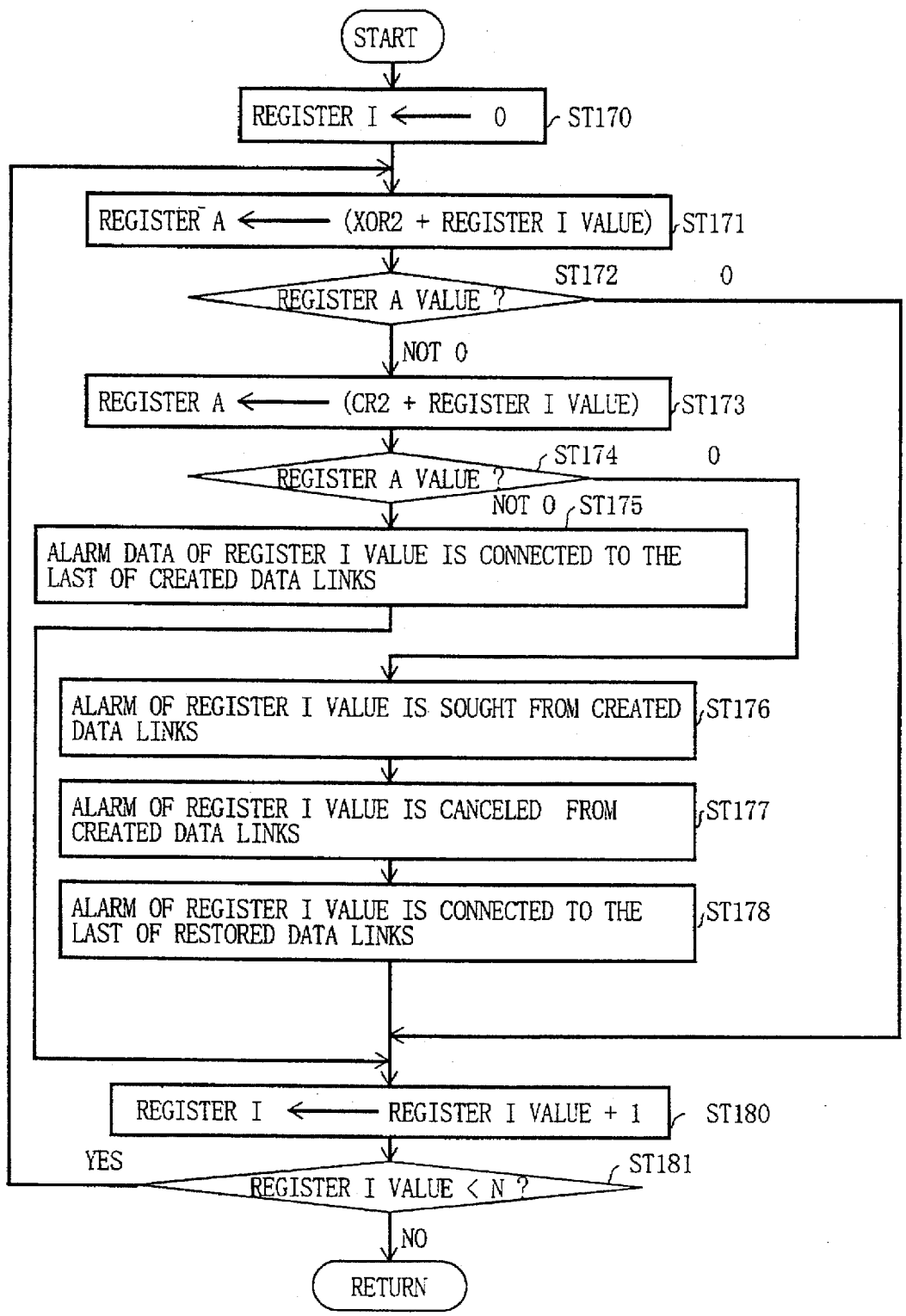
FIG. 23 is a flow chart showing a data link creating process.

FIG. 23 is a flow chart showing the data link creation process. When the process is started, the content of the register I is set to 0 at a step ST170 and the value of XOR2 + the value of register I is stored in the register A at a step ST171. It is judged at a step ST172 whether or not the content of the register A is 0. When it is not 0, it represents that any change is found. Therefore, information stored in the memory region appointed by the value of register CR2 + the value of register I is stored in the register A at a step ST173, and it is judged at a step ST174 whether or not the value in the register A is 0.

The judgment at the step ST174 is intended to find whether or not an alarm is caused or whether or not an occurring alarm is again caused. When it is not 0 at the step ST174, alarm data appointed by the value of the register I is linked at a step ST175 to the last of the occurring data links.

When it is judged at the step ST174 that the value of the register A is 0, an alarm appointed by the value of the register I is obtained at a step ST176 from the occurring data link. The alarm appointed by the value of the register I is removed at a step ST177 from the occurring data link and it is connected to the last of the restoring data link at a step ST178.

When the value of the register A is judged at the step ST172 to be 0 and when steps ST175 and ST179 are finished, the value of the register I is set to have an increment of +1 at a step ST180, and it is judged at a step ST181 whether or not the value of the register I is smaller than N. When it is smaller, the process is repeated from the step ST171.

Step ST175 is intended to connect the link to data, and steps ST176–ST179 to remove it from data and connect it to the last of the restoring data links.

When all of the steps are conducted as described above, the data link creation process is finished.

Figure 24:
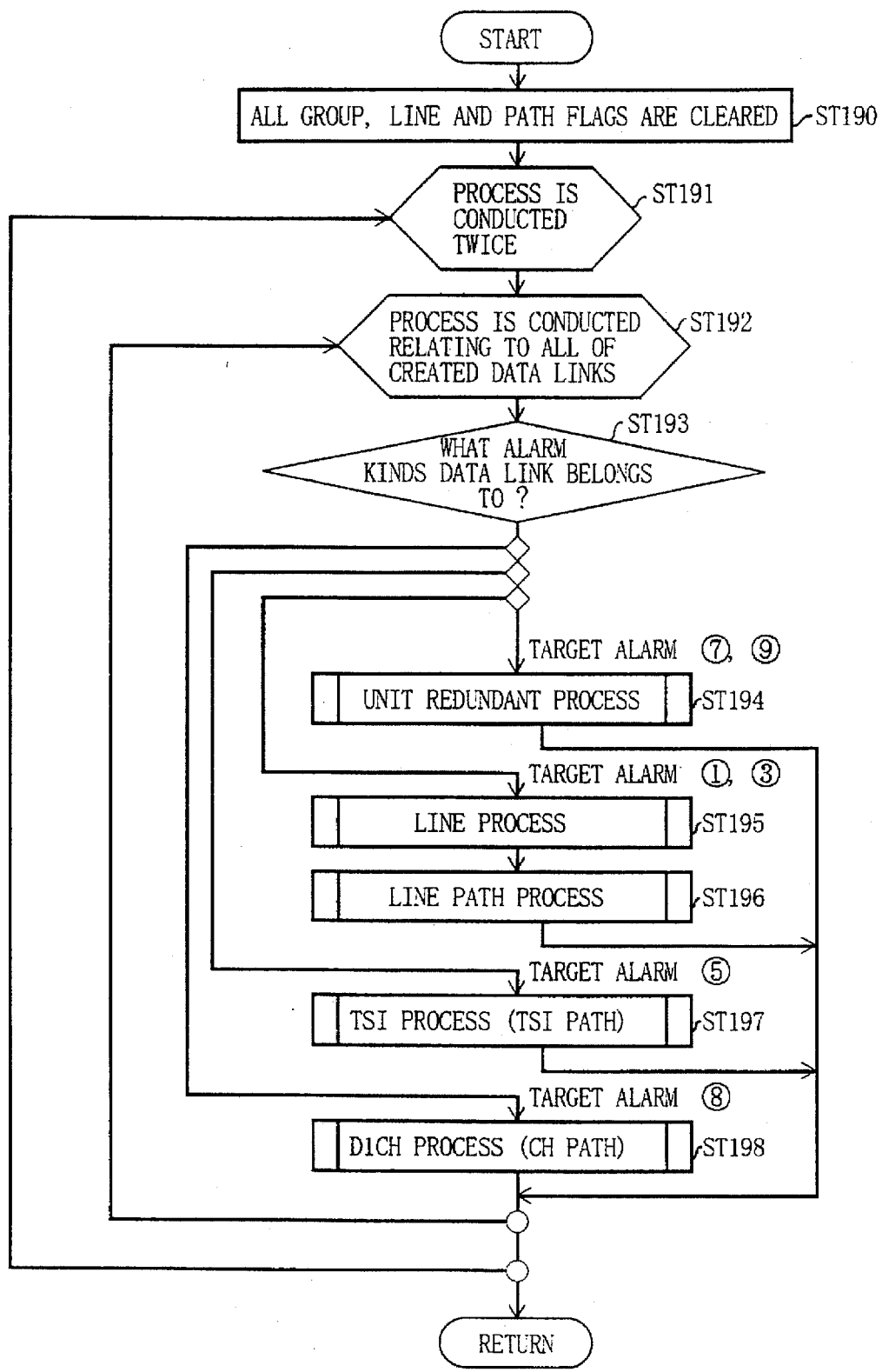
FIG. 24 is a flow chart showing an alarm judgment process.

FIG. 24 is a flow chart showing the alarm judgment process. When the process is started, group, line and path flags are cleared at a step ST190, and a process which will be conducted twice is instructed at a step ST191. Further, it is instructed that all of occurring data links are processed at a step ST192.

It is judged at a step ST193 what types the alarms of the data links are. If target alarms are those represented by (7) and (9) in FIG. 2, the unit redundancy process is conducted at a step ST194. If they belong to those represented by (1) and (3), the line process is conducted at a step ST195 and the line path process is then conducted at a step ST196.

When target alarms are those represented by (5), the TSI process is conducted at a step ST197. When they belong to those represented by (8), the D1CH process is conducted at a step ST198. This process is twice conducted twice relating to all of the data. When it is repeated twice, the state of a connected associate can be judged with a higher accuracy.

FIG. 25 is a flow chart showing the unit redundancy process. The unit redundancy process is intended to make judgment for every unit. When the process is started, it is checked at a step ST200 whether or not the group flag is 1, and when it is 1, the target alarm is judged to be SA at a step ST201 and the flag is set to 1. When it is 0, it is checked at a step ST202 whether or not the arrangement is redundant, and when it is not redundant, the target alarm is judged to be SA. When it is redundant, it is checked at a step ST203 whether or not the unit is being used and when it is being used, the target alarm is similarly judged to be SA at the step ST201. When it is not being used, the process is finished. The flag 1 which has been judged to be SA can be obtained by the above process.

Figure 26:
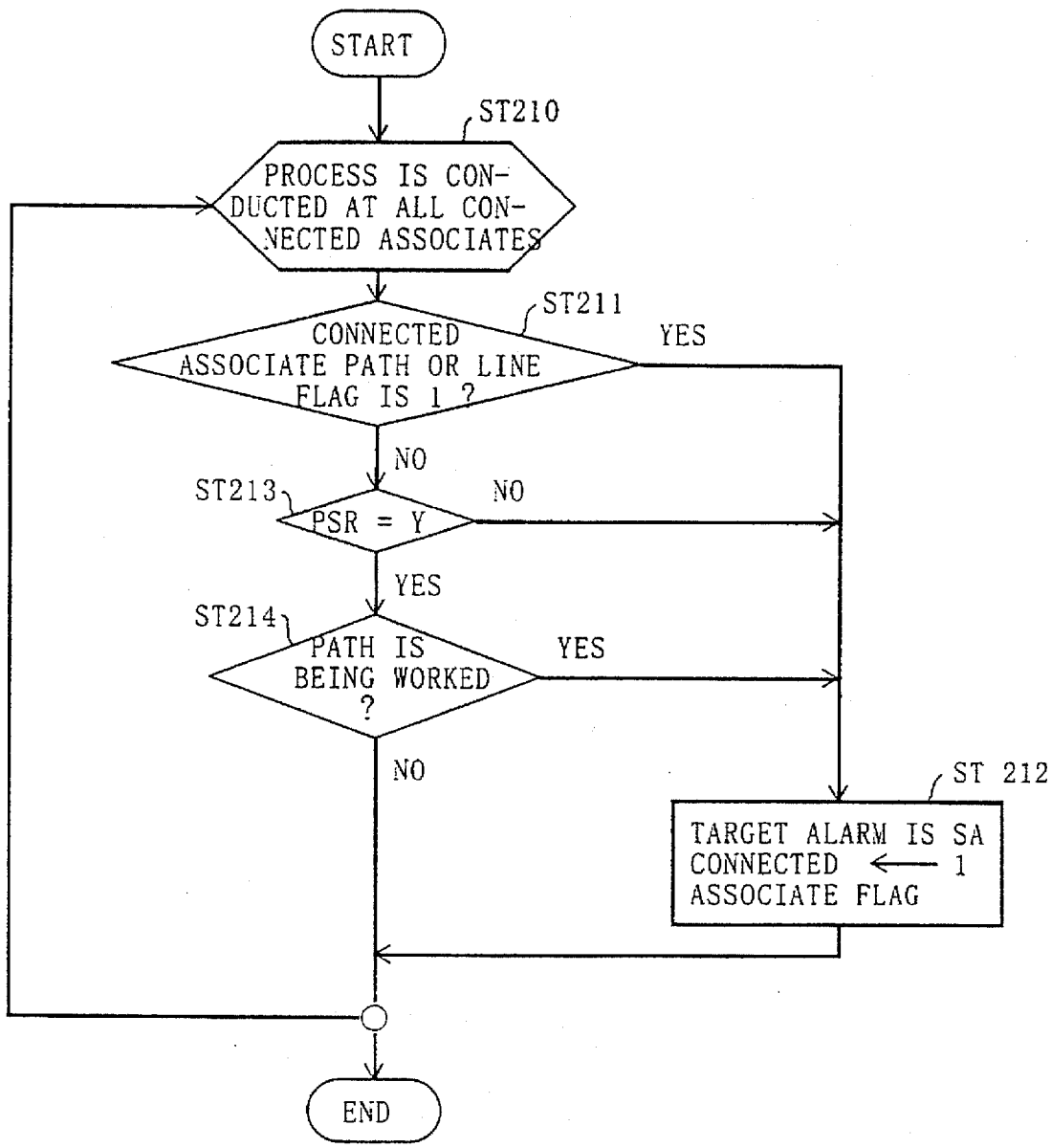
FIG. 26 is a flow chart showing a LINE path process.

FIG. 26 is a flow chart showing the line path process. When the flow of this line path process is executed, process which will be conducted for all of the connected associates is instructed at a step ST210. It is then checked at a step ST211 whether or not the connected associate path or line flag is.1, and when it is 1 (YES), the target alarm is judged to be SA and the connected associate flag is set to 1. When it is not 1 (NO), it is checked whether or not PSR is Y, and when it is not Y (NO), the target alarm is judged to be SA and the connection flag is set to 1 at a step ST212. When PSR is Y, it is checked at a step ST214 whether or not the path is being used, and when it is being used, the target alarm is again judged to be SA at the step ST212 and the connection flag is set to 1. When it is not being used, nothing is done.

When conducted for the connected associates of all channels as described above, the line path process is finished.

Figure 27:
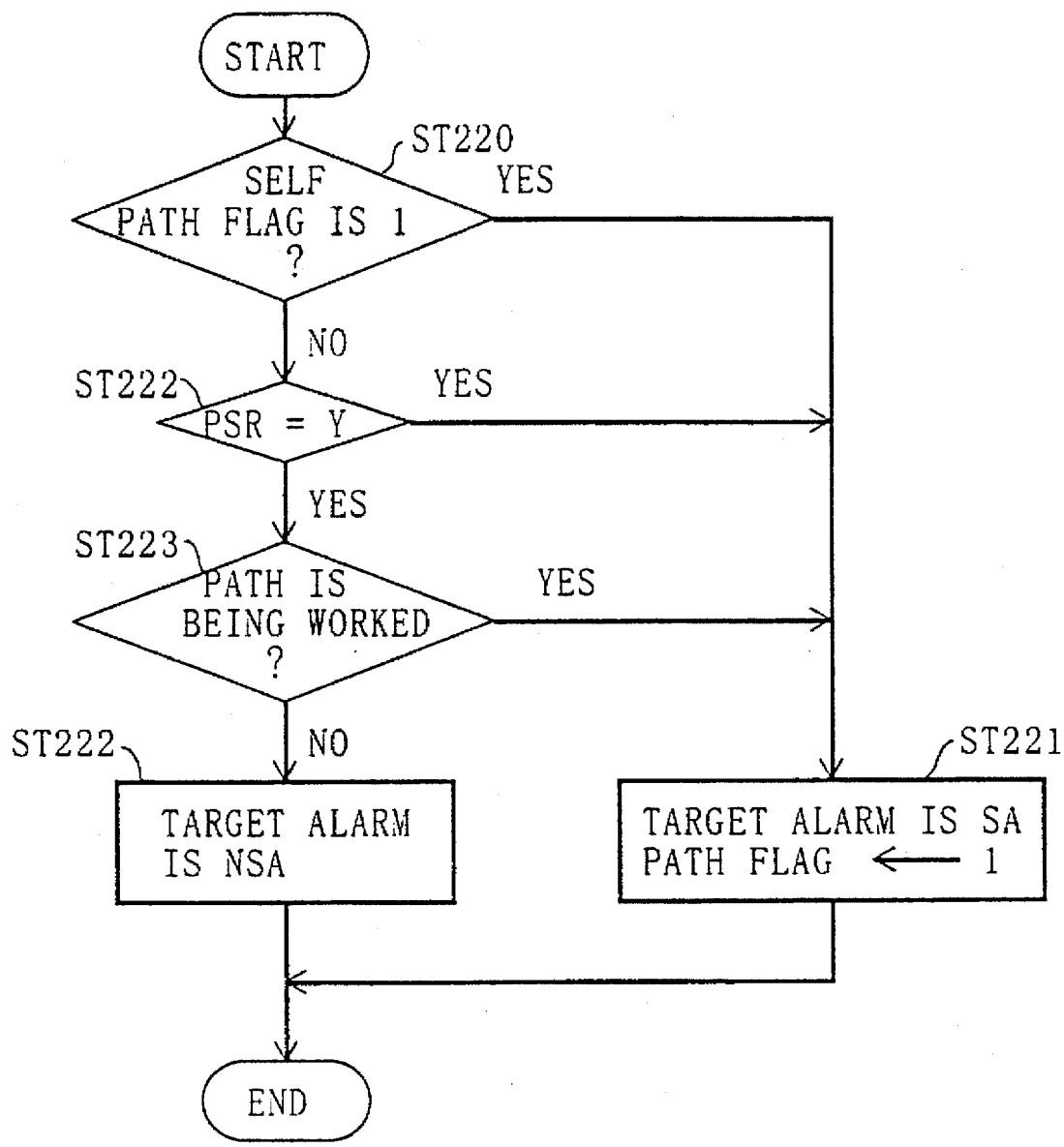
FIG. 27 is a flow chart showing a CH path process.

FIG. 27 is a flow chart showing the channel path process. When the process is started, it is checked at a step ST220 whether or not a self-path flag is 1, and when it is 1 (YES), a target alarm is judged to be SA at a step ST221 and the path flag is set 1. When it is not 1 (NO), it is checked at a step ST222 whether or not PSR equals Y, and when it does not equal Y (NO), the step ST221 is executed. When it equals Y (YES), it is checked at a step ST223 whether or not the path is being used, and when it is being used, the target alarm is again judged to be SA. When it is not being used (NO), the target alarm is judged to be NSA at the step ST222. When path and line flags are set as described above and when the process is applied twice to all of the group and line paths, SA and NSA judgments can be realized.

The LINE process shown in FIG. 24 is the same as the UNIT redundancy process shown in FIG. 25, and the TSI process is also the same as the LINE path process shown in FIG. 26. This is because the alarms represented by (7) and (8) are related only to the UNIT12, and because an alarm represented by (5) is related to the LINE path.

According to the present invention as described above, the process of judging troubles to be SA and NSA can be made common to each section, and the judgment thus realized can be made simpler. This enables the process to be conducted at a higher speed. Further, prior to SA and NSA judgments, it is checked only by comparison whether or not any trouble is caused. This also enables the process to be conducted at a higher speed.

What is claimed is:

1. A trouble surveillance apparatus for transmission system comprising:

input memory means for storing data representing a state of the transmission system;

comparison means for comparing data stored in the input memory means and representing a previous state of the system with data currently inputted to the input memory means and representing a current state of the system; and trouble judging means for firstly judging that trouble is caused when previous data does not coincide with the current data and that the trouble is judged to be a Service Affect when trouble flags are arranged to correspond to LINEs and channels, wherein at least one of the LINEs and channels correspond to a connected LINE and channel which is set.

2. The trouble surveillance apparatus for the transmission system according to claim 1, wherein the comparison made by the comparison means is an exclusives"OR".

3. The trouble surveillance apparatus for the transmission system according to claim 2, wherein the exclusive "OR" is simultaneously made relative to a plurality of channels.

4. The trouble surveillance apparatus for the transmission system according to claim 2, wherein said comparison means logically sums the exclusive "OR" and judges that a trouble is caused when the logic sum thus obtained is true.

5. The trouble surveillance apparatus for the transmission system according to claim 1, wherein when the flag of a connected circuit is not set, it is checked whether or not the path of a circuit-forming channel is redundant and when it is not redundant, the trouble is judged to be a Service Affect.

6. The trouble surveillance apparatus for the transmission system according to claim 5, wherein when the path is redundant, it is checked whether or not the path is being used and when it is being used, the trouble is judged to be a Service Affect.

7. A trouble surveillance apparatus for transmission system comprising:

input memory means for storing data representing a state of the transmission system;

comparison means for comparing data stored in the input memory means and representing a previous state of the system with data currently inputted to the input memory means and representing a current state of the system;

trouble judging means for firstly judging that trouble is caused when previous data does not coincide with the current data and that the trouble is judged to be a Service Affect when trouble flags are arranged to correspond to LINEs and channels, wherein at least one of the LINEs and channels correspond to a connected LINE and channel which is set; and data link means for storing a data block of the trouble information in the form of a data link when the trouble is judged by the trouble judging means.

8. The trouble surveillance apparatus for the transmission system according to claim 7, wherein the comparison made by the comparison means is an exclusive "OR".

9. A trouble surveillance apparatus for a transmission system comprising:

input memory means for storing data representing a state of the transmission system;

comparison means for comparing data stored in the input memory means and representing a previous state of the system with data currently inputted to the input memory means and representing a current state of the system; and trouble judging means for firstly judging that trouble is caused when the previous data does not coincide with the current data, secondly judges whether or not a flag arranged to correspond to a circuit is set, thirdly judges whether or not a path of a channel relating to the circuit is redundant when the flag is not set, and fourthly judges whether or not the path is being used when it is redundant, to thereby judge that the trouble is None Service Affect when it is not being used.

10. The trouble surveillance apparatus for the transmission system according to claim 9, wherein when a trouble is caused, said first, second, third and fourth judgments are repeated twice to judge the trouble together with a status of a transceiver which forms a part of the circuit.

11. A trouble surveillance apparatus for a transmission system comprising:

input memory means for storing data representing a state of the transmission system;

comparison means for comparing data stored in the input memory means and representing a previous state of the system with data currently inputted to the input memory means;

trouble judging means for firstly judging that trouble is caused when the previous data does not coincide with the current data, secondly judges whether or not a flag arranged to correspond to a circuit is set, thirdly judges whether or not a path of a channel relating to the circuit is redundant when the flag is not set, and fourthly judges whether or not the path is being used when it is redundant, to thereby judge that the trouble is None Service Affect when it is not being used; and data link means for storing a data block of the trouble information in the form of a data link when the trouble is judged by the trouble judging means.

12. A trouble surveillance apparatus for a transmission system comprising:

an input memory means for storing data representing a state of the transmission system;

a comparison means for comparing data stored previously in the input memory means and representing the previous state of the system with data currently stored in the memory means and representing the current state of the system;

a mask process means for masking data which do not coincide with the previous data to cancel data representing troubles which have no direct affect on the transmission system; and a trouble judging means for judging troubles of the transmission system on the basis of data applied from the mask process means.

13. A trouble surveillance apparatus for a transmission system comprising:
   an input memory means for storing data representing a state of the transmission system;
   a comparison means for comparing data stored in the input memory means and representing the previous state of the system with data currently stored in the memory means and representing the current state of the system;
   a mask process means for masking data which do not coincide with the previous data to cancel data representing troubles which have no direct affect on the transmission system;
   a trouble judging means for judging troubles of the transmission system on the basis of data applied from the mask process means; and
   a data link means for storing a data block of information relating to troubles as data links when they are judged to be troubles by the trouble judging means.

14. The trouble surveillance apparatus for the transmission system according to claim 13, wherein said data link means includes means for connecting data which is judged to be trouble by said trouble judging means to an end of generated data links, and restoring means for retrieving, from said generated data links, data which is judged not to coincide with the previous data by the comparison means and representing trouble which has no direct affect on the transmission system, to thereby connect it to an end of restored data links.

15. A trouble surveillance apparatus for a transmission system comprising:
   an input memory means for storing data representing a state of the transmission system;
   a first comparison means for comparing data stored in the input memory means and representing the previous state of the system with data currently stored in the memory means and representing the current state of the system;
   a mask process means for applying a secondary mask process to data, which has been judged not to coincide with the previous data by the first comparison means, to create masked data;
   a second comparison means for comparing previous and current data created by the mask process means;
   a data link means for storing the current data, which has been judged not to coincide with the previous data by the second comparison means, in the form of a data link; and
   an alarm process means for checking a path twice on the basis of the data stored in the data link means to judge whether the trouble is a Service Affect or None Service Affect.

16. The trouble surveillance apparatus for the transmission system according to claim 15, wherein the process conducted by the first comparison means is a logic sum of the data, which has been judged not to coincide with the previous data by the first comparison means, and said masked data.

17. The trouble surveillance apparatus for the transmission system according to claim 15, wherein each comparison conducted by the first and second comparison means is an exclusive "OR".

18. A trouble surveillance method for use in a transmission system comprising the steps of:
   storing data representing a state of the transmission system in an input memory means;
   comparing data stored in the input memory means and representing the previous state of the system with data currently inputted to the input memory means and representing the current state of the system; and
   judging that trouble is caused when the previous data does not coincide with the current data and that the trouble is a Service Affect when trouble flags are arranged to correspond to LINEs and channels, wherein at least one of the LINEs and channels corresponds to a connected LINE and channel which is set.

19. A trouble surveillance method for use in a transmission system comprising the steps of:
   storing data representing a state of the transmission system in an input memory means;
   comparing data stored in the input memory means and representing a previous state of the system with data currently inputted to the input memory means and representing the current state of the system;
   judging that trouble is caused when the previous data does not coincide with the current data and that the trouble is a Service Affect when trouble flags are arranged to correspond to LINEs and channels, wherein at least one of the LINEs and channels correspond to a connected LINE and channel which is set; and
   storing a data block of the trouble information in the form of a data link when the trouble is judged by the trouble judging step.

20. A trouble surveillance method for use in a transmission system comprising the steps of:
   storing data representing a state of the transmission system in an input memory means;
   comparing data stored previously in the input memory means and representing the previous state of the system with data currently stored in the memory means and representing the current state of the system;
   masking data which do not coincide with the previous data to cancel data representing troubles which have no direct affect on the transmission system; and
   judging troubles of the transmission system on the basis of data applied from the mask process means.

21. A trouble surveillance method for use in the transmission system comprising the steps of:
   storing data representing a state of the transmission system in an input memory means;
   comparing data stored in the input memory means and representing the previous state of the system with data currently stored in the memory means and representing the current state of the system by using a first comparison means;
   applying a secondary mask process to data, which has been judged not to coincide with the previous data by the first comparison means, to create masked data;
   comparing previous and current data created by the mask process means by using a second comparison means;
   storing, in data link means, the current data, which has been judged not to coincide with the previous data by the second comparison means, in the form of a data link; and
   checking a path twice on the basis of the data stored in the data link means to judge whether the trouble is a Service Affect or None Service Affect.

* * * * *